(12) United States Patent
Shao et al.

(10) Patent No.: US 11,409,630 B2
(45) Date of Patent: Aug. 9, 2022

(54) SYSTEMS AND METHODS OF FORMAL VERIFICATION

(71) Applicant: Yale University, New Haven, CT (US)

(72) Inventors: Zhong Shao, Branford, CT (US);
Ronghui Gu, New Haven, CT (US);
Vilhelm Sjoberg, New Haven, CT (US); Jieung Kim, New Haven, CT (US); Jeremie Koenig, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 16/767,569

(22) PCT Filed: Nov. 28, 2018

(86) PCT No.: PCT/US2018/062883
§ 371 (c)(1),
(2) Date: May 27, 2020

(87) PCT Pub. No.: WO2019/108676
PCT Pub. Date: Jun. 6, 2019

(65) Prior Publication Data
US 2020/0387440 A1    Dec. 10, 2020

(30) Foreign Application Priority Data
Nov. 28, 2017    (FR) ...................................... 1761318

(51) Int. Cl.
*G06F 9/44*    (2018.01)
*G06F 11/36*    (2006.01)

(52) U.S. Cl.
CPC .............................. *G06F 11/3608* (2013.01)

(58) Field of Classification Search
CPC .................................................. G06F 11/3608
(Continued)

(56) References Cited

U.S. PATENT DOCUMENTS

| 8,624,921 B2 * | 1/2014 | McGreevy | .............. G06F 16/26 |
| | | | 345/629 |
| 9,774,401 B1 | 9/2017 | Borrill | |

(Continued)

OTHER PUBLICATIONS

Ronghui Gu et al. "CertiKOS: An Extensible Architecture for Building Certified Concurrent OS Kernels"; 12th USENIX Symposium on Operating Systems Design and Implementation (OSDI '16)—Nov. 2-4, 2016 • Savannah, GA, USA.*

(Continued)

*Primary Examiner* — Francisco J Aponte
(74) *Attorney, Agent, or Firm* — Wolf, Greenfield & Sacks, P.C.

(57) ABSTRACT

Systems and methods for formal verification of programs. The systems and methods provide a new game-theoretical, strategy-based compositional semantic model for concurrency, a set of formal linking theorems for composing multithreaded and multicore concurrent layers, and a compiler that supports certified thread-safe compilation and linking. Verification of an overlay interface can include determining an intermediate strategy for a primitive operation running on an underlay interface and refining that intermediate strategy to a strategy running on the overlay interface by applying a vertical and a horizontal composition rule. The refined strategy can then be composed with compatible strategies running on the overlay interface according to a parallel composition rule. Strategies may be compatible when rely conditions imposed by each strategy satisfy (Continued)

guarantees provided by the other strategies. The system and method of formal verification can be applied to formal verification of smart contracts.

7 Claims, 21 Drawing Sheets

(58) Field of Classification Search
USPC .......................................................... 717/126
See application file for complete search history.

(56) References Cited

U.S. PATENT DOCUMENTS

| | | | |
|---|---|---|---|
| 9,883,008 B2* | 1/2018 | Ravichandran | H04L 67/42 |
| 9,916,170 B2* | 3/2018 | Sampathkumar | G06F 9/45558 |
| 10,187,452 B2* | 1/2019 | Nassi | G06F 9/5077 |
| 10,353,736 B2* | 7/2019 | Nassi | G06F 9/3009 |
| 10,754,952 B2* | 8/2020 | Muller | G06F 21/57 |
| 2013/0167151 A1* | 6/2013 | Verma | G06F 9/5066 |
| | | | 718/102 |
| 2016/0011982 A1* | 1/2016 | Sandoz | G06F 9/30145 |
| | | | 712/208 |
| 2016/0117847 A1* | 4/2016 | Pandev | G01N 21/956 |
| | | | 348/87 |
| 2017/0287090 A1 | 10/2017 | Hunn et al. | |
| 2017/0344685 A1* | 11/2017 | Ganzhorn | G06F 30/394 |
| 2018/0062764 A1* | 3/2018 | Borrill | H04L 9/0852 |
| 2019/0005267 A1* | 1/2019 | Soman | G06F 21/604 |
| 2019/0018670 A1* | 1/2019 | Ramasamy | H04L 41/082 |
| 2020/0125400 A1* | 4/2020 | Venkataraman | G06N 20/00 |
| 2020/0225964 A1* | 7/2020 | Soman | G06F 9/452 |

OTHER PUBLICATIONS

Ronghui Gu et al. "Certified Concurrent Abstraction Layers"; PLDI'18, June 18ś22, 2018, Philadelphia, PA, USA.*
Hubert Garavel et al. "Compositional verification of asynchronous concurrent systems using CADP"; Acta Informatica (2015)—Apr. 22, 2015.*
Gustavo Pinto et al. "A large-scale study on the usage of Java's concurrent programming constructs"; InformaticsCenter, FederalUniversityofPernambuco(Cln-UFPE),Av. JornalistaAnibalFernandes,S/N,Recife-PE50.740-560,Brazil—The Journal of Systems and Software 106 (2015) 59-81.*
Ludovic Henrio et al. "Multi-Active Objects and Their Applications"; Logical Methods in Computer Science vol. 13(4:12)2017, pp. 1-41—Nov. 21, 2017.*
Alessandro Cimatti et al. "Software Model Checking SystemC"; IEEE Transactions on Computer-Aided Design of Integrated Circuits and Systems, vol. 32, No. 5, May 2013.*
Alex V Berka; "Interlanguages and Synchronic Models of Computation"; published on www.isynchronise.com May 25, 2010.*
International Search Report and Written Opinion for International Application No. PCT/US2018/062883, dated Feb. 6, 2019.
Gu et al., Certified Concurrent Abstraction Layers. Proceedings of 39th ACM SIGPLAN Conference on Programming Language Design and Implementation (PLDI'18). 2018:646-61.
PCT/US2018/062883, Feb. 6, 2019, International Search Report and Written Opinion.
International Preliminary Report on Patentability for International Application No. PCT/US2018/062883, dated Jun. 11, 2020.

* cited by examiner

```
1 struct ticket_lock {
2   volatile unit n, t;
3 };
4 // Functions provided by L_0
5 extern uint get_n();
6 extern void inc_n();
7 extern unit FAI_t();
8 extern void f();
9 extern void g();
10 extern void hold();
11 // M_1 module
12 void acq () {
13   uint my_t = FAI_t();
14   while(get_n()!=my_t){};
15   hold();
16 }
17 void rel () { inc_now(); }
18 // Functions provided by L_1
19 extern void acq();
10 extern void rel();
21 extern void f();
22 extern void g();
23 // M_2 module
24 void foo () {
25   acq();
26   f(); g();
27   rel();
28 }
29 // Functions provided by L_2
30 extern void foo();
31
32 // Client program P
33 // Thread running on CPU 1
34 void T1 () { foo(); }
35 // Thread running on CPU 2
36 void T2 () { foo(); }
```

FIG. 3

```
1 Function σ'_pull (s: State) (b: Loc) :=
2   match s.a.status b with
3   | free => ref s {l := s.c.pull(b)}.s. 1}{a.status . b: own s.c}
4   | _ =< None (* get stuck *)
5   end.
```

FIG. 6

| | | | | | | | |
|---|---|---|---|---|---|---|---|
| (Id, Loc) | c,b | ∈ | Nat | | bl | ∈ | b\|b\|b\|under |
| (Mem) | pm,m | ∈ | Loc → Val | (Bytes) | r | ∈ | Reg → Val |
| (PvtSt) | ρ | ::= | (pm,rs) | (Reg) | f_ρ | ::= | Type |
| (Event) | e | ∈ | ε \| c.push(b,ν) \| ... | (PvtStMap) | ι | ∈ | (c,f_ρ, m, a, l) |
| (AsmFn) | k_x86 | ∈ | List x86Instr | (Log) | | ∈ | |
| (Prim) | σ | ∈ | State → List Val → State → Val → Prop | (AsmModule) | M_x86 | ∈ | Loc → AsmFn |
| (PrimList) | L | ∈ | Loc → Prim | (Layer) | L(A) | ::= | (L,R,G) |
| (Rely, Guar) | R,G | ∈ | ID → Inv | (Strategy) | φ | ∈ | Log Log |

| | | | |
|---|---|---|---|
| | ν | ::= | EIP \| EAX ... |
| (Val) | rs | ∈ | Id → PvtSt |
| (RegSet) | a | ∈ | List Event |
| (Abs) | s | ::= | Loc → AsmFn |
| (State) | | | |
| (Inv) | INV | ∈ | Log → Prop |
| (EO) | ε | ∈ | Id → Strategy |

FIG. 7

```
1 Fixpoint R_shared (l : Log) (b: Loc) (c: Id :=
2   match l with
3     | nil  => ret (vundef, free)  (* initial value *)
4     | e :: l' =>   (* l' • a *)
5       do r <- R_shared l' b;  (* Haskell syntax sugar*)
6         match r, e with
7           | (v,  free) , c. pull(b)  => ret (v, own c)
8           | (_, own c), c.push(b,v) => ret (v,  free)
9           | _ => None (* get stuck *)
10        end
11  end.
12 Function σ_pull ε (s: State) (b. Loc) :=
13   let l' := s.c.pull(b) :: ε[s. c,  s. l] in  (* query ε *)
14   do r <- R_shared l' b s. c; ret s {l: l'} {m.b: fst r}.
15 Function σ_push ε (s: State) (b: Loc) :=
16   let l' := s.c.push(b, s.m b) :: s .l in  (* do not query ε *)
17   do _ <- R_shared l' b s.c; ret s {l: l'}.
```

FIG. 8

$$\frac{}{L_1[A] \vdash_{\text{id}} \varnothing : L[A]} \text{EMPTY}$$

$$\frac{(|k|)L_1[c] \leq R \ \sigma}{L_1^i[c] \vdash_{\text{id}} i \mapsto \sigma} \text{F}_{\text{UN}}$$

$$\frac{L_1[A] \vdash_R M : L_2[A] \quad L_2[A] \vdash_S N : L_3[A]}{L_1[A] \vdash_{R \circ S} M \oplus N : L_3[A]} \text{V}_{\text{COMP}}$$

$$\frac{L_1[A] \vdash_R M : L_1[A] \quad L_1[A] \vdash_R N : L_2[A]}{L_1[A] \vdash_R M \oplus N : (L_1 \oplus L_2)[A]} \text{H}_{\text{COMP}}$$

$$\frac{L_1'[A] \leq_R L_1[A] \quad L_1[A] \vdash_R M : L_2[A] \quad L_2[A] \leq_T L_2'[A]}{L_1'[A] \vdash_{R \circ S \circ T} M : L_2'[A]} \text{W}_K$$

$$\frac{L_1[A] \vdash_R M : L_2[A] \quad L_1[B] \vdash_R M : L_2[B] \quad L_1[A \cup B] \vdash_R M : L_2[A \cup B]}{L_1[A \cup B] \vdash_R M : L_2[A \cup B]} \text{P}_{\text{COMP}}$$

$$\frac{A \perp B \quad \forall i \in A, L[B].\mathcal{R}(i) \subseteq L[A].\mathcal{G}(i) \quad \forall i \in B, L[A].\mathcal{R}(i) \subseteq L[B].\mathcal{G}(i)}{L[A \cup B].\mathcal{R} = L[A].\mathcal{R} \quad L[A \cup B].\mathcal{G} = L[A].\mathcal{G} \cup L[B].\mathcal{G} \quad L[A \cup B].\mathcal{L} = L[A].\mathcal{L} \oplus L[B].\mathcal{L}} \text{PARALLEL}$$

$$\frac{L[A] \ ||| \ L[B] = L[A \cup B]}{}$$

FIG. 9

```
1 void acq (uint b) {              6 void rel (uint b) {
2   uint myt=▷FAI t (b);            7   push(b) ;//critical st exit
3   while(▷get_n(b) !=myt) {}       8   ▷inc_n (b);
4   ▷pull (b) ;// acts as hold ()   9 }
5 }
```

FIG. 10

```
1 Function σ_deQ_t ε (s: State) (i: Loc) :=
2   do r <- R'_shared s. l. i. s. c;  (*use acq/rel to replay ownership*)
3   match r with
4   | (_, own s.c) => (*if the lock of queue i is held*)
5       match s. a. tdqp i with (* case over the queue*)
6       | td :: q => ret (s { s.a.tdqp . i : q}, td)
7       | _ => ret (s, -1) (* return -1 for empty queue*)
8       end
9   | _ => None (*get stuck*)
10  end.
```

FIG. 11

$$\frac{m_1 \circledast m_2 = m}{\mathrm{nb}(m) = \max(\mathrm{nb}(m_1), \mathrm{nb}(m_2))} \ (\mathrm{N_B})$$

$$\frac{m_1 \circledast m_2 = m}{m_2 \circledast m_1 = m} \ (\mathrm{Comm})$$

$$\frac{m_1 \circledast m_2 = m \quad \mathrm{nb}(m_1) \le \mathrm{nb}(m_2) \quad \mathrm{liftnb}(m_2, n) = \mathrm{liftnb}(m, n)}{\mathrm{liftnb}(m_1, n) \circledast m_2 = \mathrm{liftnb}(m, n - (\mathrm{nb}(m) - \mathrm{nb}(m_1)))} \ (\mathrm{Lift\text{-}R})$$

$$\frac{m_1 \circledast m_2 = m \quad \mathrm{nb}(m_1) \le \mathrm{nb}(m_2)}{\mathrm{liftnb}(m_1, n) \circledast m_2 = \mathrm{liftnb}(m, n - (\mathrm{nb}(m) - \mathrm{nb}(m_1)))} \ (\mathrm{Lift\text{-}L})$$

$$\frac{m_1 \circledast m_2 = m \quad \mathrm{nb}(m_1) \le \mathrm{nb}(m_2)}{m_1 \circledast \mathrm{alloc}(m_2, l, h) = \mathrm{alloc}(m, l, h)} \ (\mathrm{Alloc})$$

$$\frac{m_1 \circledast m_2 = m}{m_1 \circledast \mathrm{st}(m_2, \ell, v) = \mathrm{st}(m, \ell, v)} \ (\mathrm{S_T})$$

$$\frac{m_1 \circledast m_2 = m \quad \mathrm{ld}(m_2, \ell) = \lfloor v \rfloor}{\mathrm{ld}(m, \ell) = \lfloor v \rfloor} \ (\mathrm{L_D})$$

FIG. 12

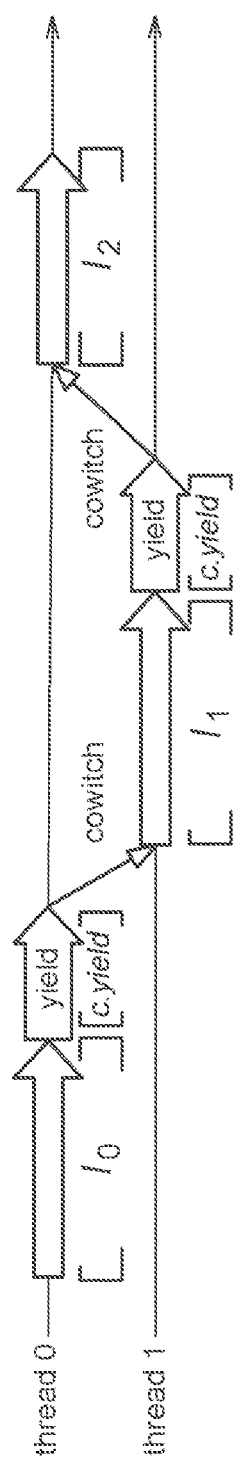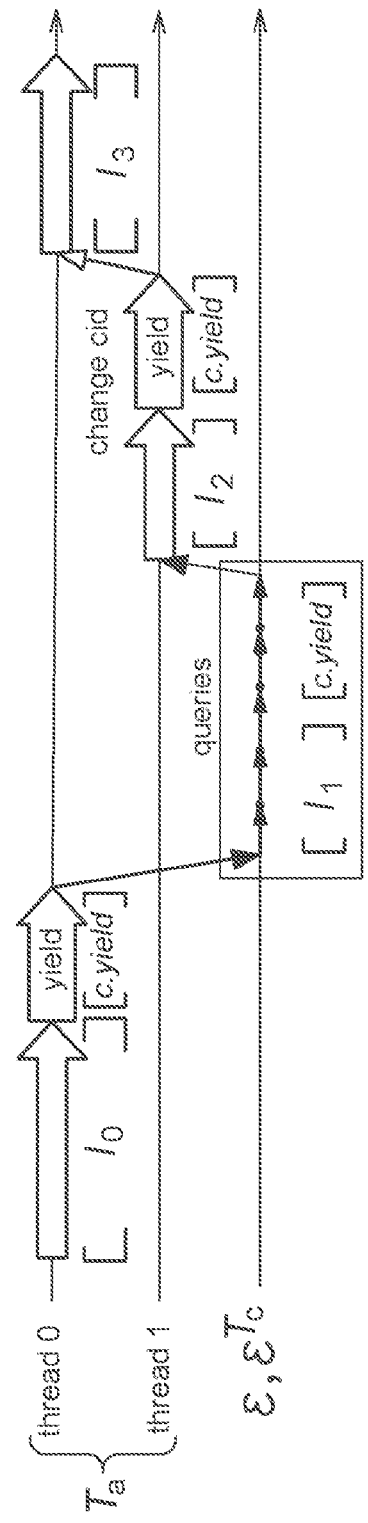

| Component | LOC | Component | LOC |
|---|---|---|---|
| Auxiliary library | 6,200 | Multilayer linking | 17,000 |
| C verifier | 2,200 | Multithread linking | 10,000 |
| Asm verifier | 800 | Multicore linking | 7,000 |
| Simulation library | 1,800 | Thread-safe CompCertX | 7,500 |

FIG. 14E

| | C & Asm Source | Spec. | Invariant Proof | C & Asm Proof | Simulation Proof |
|---|---|---|---|---|---|
| Ticket lock | 74 | 615 | 1,080 | 1,173 | 2,296 |
| MCS lock | 287 | 1,569 | 2,299 | 1,899 | 3,049 |
| Sequential queue | 377 | 554 | 748 | 2,821 | 3,647 |
| Shared queue | 20 | 107 | 190 | 171 | 419 |
| Yield/Sleep/Wakeup | 62 | 153 | 166 | 1,724 | 2,042 |
| Queuing lock | 112 | 255 | 992 | 328 | 464 |

FIG. 14F

SYSTEMS AND METHODS OF FORMAL VERIFICATION

FEDERALLY SPONSORED RESEARCH

This invention was made with government support under 1521523 awarded by National Science Foundation and under FA8750-12-2-0293 awarded by United States Air Force Office of Scientific Research. The government has certain rights in the invention.

CROSS-REFERENCE TO RELATED APPLICATIONS

This application is a national stage filing under 35 U.S.C. § 371 of International Patent Application Serial No. PCT/US2018/062883, filed Nov. 28, 2018, which claims priority to French patent application number 17/61318, filed Nov. 28, 2017. The contents of these applications are incorporated herein by reference in their entirety.

BACKGROUND

Abstraction layers are key techniques used in building large-scale concurrent software and hardware. Concurrent abstraction layers are ubiquitous in modern computer systems because of the pervasiveness of multithreaded programming and multicore hardware. Abstraction layers are used to hide the implementation details (e.g., fine-grained synchronization) and reduce the complex dependencies among components at different levels of abstraction. Despite their obvious importance, concurrent abstraction layers have not been treated formally. This severely limits the applicability of layer-based techniques and makes it difficult to scale verification across multiple concurrent layers.

Distributed ledgers provide another example of concurrent execution. Such systems, such as blockchain-based databases, allows decentralized management of records in a secure and transparent manner. For instance, a blockchain may be used as an open ledger for recording transactions among various parties, and may be maintained by a network of nodes. These nodes may each maintain a local copy of the blockchain, and may collectively execute a protocol to ensure that the local copies remain consistent with each other as new transactions are recorded. Blockchain technology may be suitable for a variety of applications where a high level of security is desirable, such as identity management, transaction processing, medical recordkeeping, traceability in logistics, etc. However, the same characteristics that make blockchain technology suitable for such high-value application also make formal verification of such applications difficult, due to the concurrency of execution between nodes and the multiple levels of abstraction between the overall distributed ledger and the hardware implementing the nodes of the distributed ledger.

SUMMARY

Embodiments may be used for building certified concurrent abstraction layers. These embodiments may include program verifiers for concurrent C and assembly that apply a fine-grained concurrent layer calculus, certified linking tools, and a thread-safe verified C compiler. Embodiments may further include the application of these tools to the verification of smart contracts.

Embodiments may include a method for formal verification of an overlay interface. The method can include modeling the overlay interface as multiple layer implementations built on an underlay interface, the underlay interface parameterized by multiple thread sets. The method can further include verifying the overlay interface by performing at least one of the following operations.

A first operation can verify that a map to a program built on the underlay interface implements a map to a strategy. The semantics of running the shared primitive on the underlay interface can be simulated by the strategy.

A second operation can verify that a first program module implements the overlay interface according to a first simulation relationship. A second program module built on the underlay interface can implement a first intermediate interface according to a second simulation relationship. A third program module built on the first intermediate interface can implement the overlay interface according to a third simulation relationship. The first program module can be a composition of the second and third program modules and the first simulation relationship can be a composition of the second and third simulation relationships.

A third operation can verify that a fourth program module implements the overlay interface according to a fourth simulation relationship. A fifth program module built on the underlay interface can implement a second intermediate interface according to the fourth simulation relationship. A sixth program module built on the underlay interface can implement a third intermediate interface according to the fourth simulation relationship. The fourth program module can be a composition of the fifth and sixth program modules and the overlay interface can be a composition of the second and third intermediate interfaces.

A fourth operation can verify that a seventh program module built on a fourth intermediate interface implements a fifth intermediate interface according to a fifth simulation relationship. The fourth intermediate interface can be simulated by the underlay interface according to a sixth simulation relationship. The seventh program module can implement the overlay interface according to a seventh simulation relationship. The overlay interface can be simulated by the fifth intermediate interface according to an eighth simulation relationship. The fifth simulation relationship can be a composition of the sixth, seventh, and eighth simulation relationships.

A fifth operation can verify that an eighth program module built on the underlay interface implements the overlay interface. The underlay interface can be parameterized by the union of a first thread set and a second thread set. The overlay interface can be parameterized by the union of a first thread set and a second thread set. A first underlay interface can be parameterized by the first thread set and a second underlay interface can be parameterized by a second thread set. A first overlay interface can be parameterized by the first thread set and a second overlay can be interface parameterized by the second thread set. The eighth program module built on the first underlay interface can implement the first overlay interface. The eighth program module built on the second underlay interface can implement the second overlay interface. The first underlay interface can be compatible with the second underlay interface. The first overlay interface can be compatible with the second overlay interface.

A sixth operation can verify that an interface parameterized by a third thread set is compatible with the interface parameterized by a fourth thread set. In some aspects, for all threads in third thread set, rely conditions for the interface parameterized by the fourth thread set can imply guarantee conditions for the interface parameterized by the third thread set. In various aspects, for all threads in fourth thread set, rely conditions for the interface parameterized by the third thread set can imply guarantee conditions for the interface parameterized by the fourth thread set. Rely conditions for the interface parameterized by the intersection of the third and fourth thread sets can equal the union of the rely conditions for the interface parameterized by the third thread set and the rely conditions for the interface parameterized by the fourth thread set. Guarantee conditions for the interface parameterized by the intersection of the third and fourth thread sets can equal the intersection of the guarantee conditions for the interface parameterized by the third thread set and the guarantee conditions for the interface parameterized by the fourth thread set. The collection of primitives for the interface parameterized by the intersection of the third and fourth thread sets equals the composition of the collection of primitives for the interface parameterized by the third thread set and the collection of primitives for the interface parameterized by the fourth thread set.

Embodiments may include a method for formal verification of an overlay interface. The method can include an operation of determining the semantics of running a first shared primitive on an underlay interface are simulated by a first strategy. The first strategy can describe actions of the first primitive as a first function of a first log. The determining can include constructing a proof of the simulation relationship. The method can include an operation of generating an intermediate concurrent layer by composing the first strategy with a second strategy that describes actions of a second shared primitive on the underlay interface as a second function of the first log. The method can include an operation of determining that the intermediate concurrent layer is simulated by a first overlay layer.

Embodiments may include a method for verifying smart contracts. The method can include an operation of modeling one or more smart contracts as a concurrent abstraction layer. The concurrent abstraction layer can include a layer implementation, an underlay interface, and an overlay interface. The layer implementation can include the one or more smart contracts. The method can include an operation of verifying correctness of the one or more smart contracts, at least in part by constructing a formal proof that the layer implementation, running on top of the underlay interface, simulates the overlay interface.

The foregoing summary is provided by way of illustration and is not intended to be limiting.

BRIEF DESCRIPTION OF DRAWINGS

FIG. 3 depicts exemplary code for using a lock to protect a critical section of a program.

FIG. 6 depicts the specification for the strategy $\sigma_{pull}'$, where r{i:v} denotes updating the record r at field i with value v.

FIG. 7 depicts the machine state for the concurrent machine model and the concurrent layer interface.

FIG. 8 depicts exemplary specifications for push/pull primitives of L[c] that deliver the effects of shared memory operations.

FIG. 9 lists a layer calculus usable to build and compose concurrent layers.

FIG. 10 depicts pseudocode for an exemplary ticket lock.

FIG. 11 depicts a specification for an intermediate layer of a queuing lock, which can be used to verify the specification of an overall multithreaded queuing lock.

FIG. 12 depicts an extended memory model satisfying the requirements for parallel composition of assembly layers.

FIG. 14A-D depict the operation of scheduling primitives in various thread configurations.

FIG. 14E presents the number of lines (in Coq) for each component in FIG. 2.

FIG. 14F presents some of the statistics with respect to the implemented components.

DETAILED DESCRIPTION

Concurrent abstraction layers can be used in modern computer systems with multithreaded programming and multicore hardware. Abstraction layers can be used to hide the implementation details (e.g., fine-grained synchronization) and reduce the complex dependencies among components at different levels of abstraction. However, systems and methods for formal verification of the concurrent abstraction layers are inadequate, limiting the applicability of layer-based techniques and makes it difficult to scale verification across multiple concurrent layers. The disclosed embodiments include a programming toolkit for specifying, composing, compiling, and linking certified concurrent abstraction layers. The disclosed embodiments provide improvements in technology including a new game-theoretical, strategy-based compositional semantic model for concurrency (and its associated program verifiers), a set of formal linking theorems for composing multithreaded and multicore concurrent layers, and a compiler that supports certified thread-safe compilation and linking. The disclosed embodiments can be implemented in Coq and can support layered concurrent programming in both C and assembly, though the disclosed embodiments are not limited to such implementations and languages. Also disclosed is a fully certified concurrent OS kernel with fine-grained locking.

Abstraction layers (e.g., circuits, ISA, device drivers, OS kernels, and hypervisors) can be used in modern computer systems to help reduce the complex interdependencies among components at different levels of abstraction. An abstraction layer can define an interface that hides the implementation details of its underlying software or hardware components. Client programs built on top of each layer can be understood solely based on the interface, independent of the layer implementation. These abstraction layers can be concurrent in nature. Their interfaces may (in addition to hiding concrete data representations and algorithmic details) create an illusion of atomicity for all of their methods. For example, a user of the interface may treat such a method call as if it completes in a single step, even though its implementation contains complex interleavings with operations done by other threads. Layers of these atomic objects can be used to construct large-scale concurrent software systems.

As an exemplary application, the formal verification framework described herein can be used to verifying smart contracts. In some embodiments, one or more smart contracts may be verified as a concurrent abstraction layer. For instance, the concurrent abstraction layer may include a layer implementation, an underlay interface, and an overlay interface, where the layer implementation may include the one or more smart contracts. Correctness of the one or more smart contracts may then be verified by constructing a formal proof that the layer implementation, running on top of the underlay interface, simulates the overlay interface.

Figure 1:
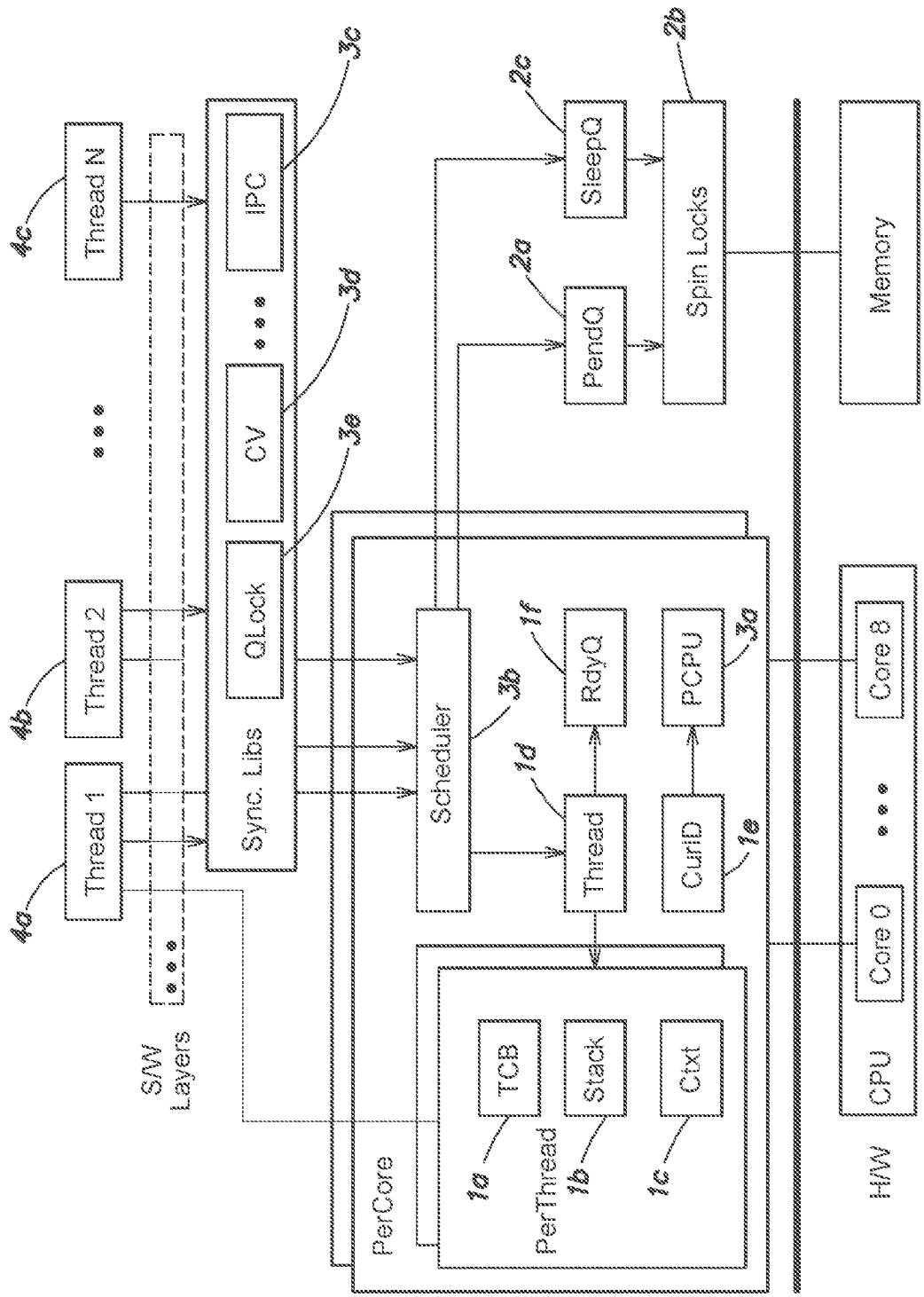
FIG. 1 depicts a schematic of exemplary concurrent layer objects in a modern multicore runtime.

FIG. 1 presents a schematic of exemplary concurrent layer objects in a modern multicore runtime. In this example, an arrow means a possible function call from one component to another. The components include thread-local (or CPU-local) objects (e.g., $1a$-$1f$), objects shared between CPU cores (e.g., $2a$-$2c$), objects exported and shared between threads (e.g., $3a$-$3e$), and orange for threads themselves (e.g., $4a$-$4c$). An efficient and starvation-free spinlock implementation $2b$ can be constructed above the hardware layers. Spinlocks can implement shared objects for sleep thread queues $2a$ and pending thread queues $2c$, which can be used to implement thread schedulers $3b$, and the primitives yield, sleep, and wakeup. High-level synchronization libraries such as queuing locks $3e$, condition variables (CV) $3d$, and message-passing primitives $3c$ can be implemented on top of the thread schedulers and the primitives yield, sleep, and wakeup.

Formal reasoning across multiple concurrent layers is challenging because different layers often exhibit different interleaving semantics and have a different set of observable events. For example, the spinlock module in FIG. 1 assumes a multicore model with an overlapped execution of instruction streams from different CPUs. This model differs from the multithreading model for building high-level synchronization libraries: each thread will block instead of spinning if a queuing lock or a CV event is not available; and it must count on other threads to wake it up to ensure liveness. Reasoning across these different abstraction levels requires a general, unified compositional semantic model that can cover all of these concurrent layers. It must also support a general "parallel layer composition rule" that can handle explicit thread control primitives (e.g., sleep and wakeup). It must also support vertical composition of these concurrent layer objects while preserving both the linearizability and progress (e.g., starvation-freedom) properties.

Figure 2:
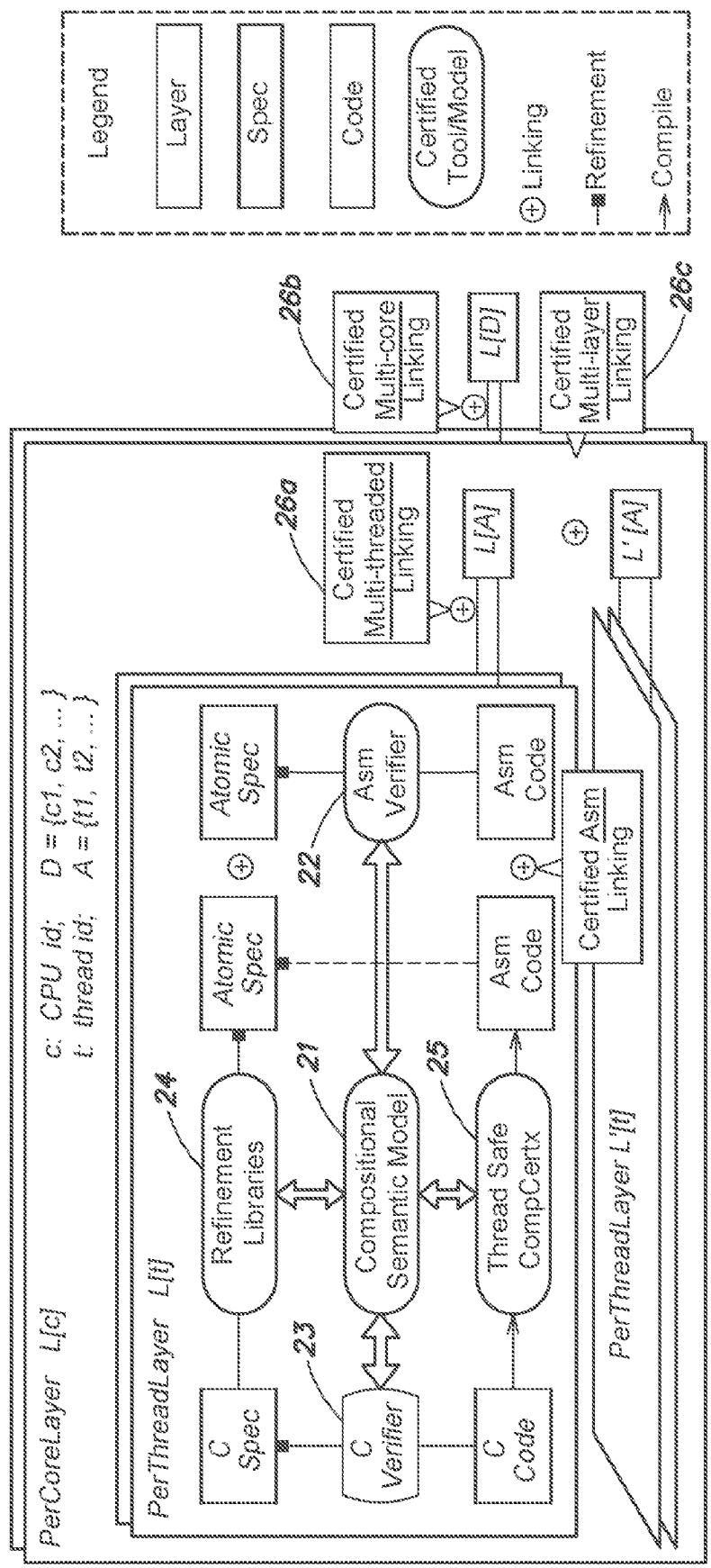
FIG. 2 depicts a programming toolkit for building certified concurrent abstraction layers.

The disclosed embodiments include a fully mechanized programming toolkit implemented for building certified concurrent abstraction layers. This toolkit can be implemented in Coq. As shown in FIG. 2, this toolkit can include one or more of a compositional semantic model 21 for concurrency, a collection of C program verifiers 23 and assembly program verifiers 22, a library for building layered refinement proofs 24, a thread-safe verified C compiler based on CompCertX 25, or a set of certified linking tools for composing multithreaded or multicore layers (e.g., 26$a$-26$c$). A certified concurrent abstraction layer can be described as a triple ($L_1[A]$, M, $L_2[A]$) plus a mechanized proof object showing that the layer implementation M, running on behalf of a thread set A over the interface $L_1$ implements the more abstract interface $L_2$. Compositional semantics model 21 can use game semantics to enable local reasoning, such that an implementation can be verified over a single thread t by building (L1[{t}],M, L2[{t}]). Guarantees for the implementation over the single thread can be propagated to additional threads by parallel compositions. Concurrent layers can enforce a termination-sensitive contextual correctness property. As applied to concurrent abstraction layers, this termination-sensitive contextual correctness property can means that every certified concurrent object satisfies not only a safety property (e.g., linearizability) but also a progress property (e.g., starvation-freedom).

Certain disclosed embodiments can implement a compositional semantic model for shared-memory concurrent abstract machines and enable a general parallel layer composition rule. Such embodiments can be used to specify, verify, and compose various concurrent objects at different levels of abstraction. Simulation techniques can be applied using the disclosed embodiments to verify the safety and liveness of concurrent objects in a unified setting. The disclosed embodiments can be used to impose temporal invariants such as fairness requirements (for schedulers) or definite actions (for releasing locks). enabling full specifications for lock primitives and support for vertical composition of starvation-free atomic objects, both technical improvements in the field of formal verification.

Certain disclosed embodiments can compile certified concurrent C layers into assembly layers. To enable certified multithreaded linking, such embodiments support an extended algebraic memory model whereby stack frames allocated for each thread are combined to form a single coherent memory.

Embodiments disclosed herein concern shared-memory concurrent program modules, which can be used to verify layers as shown in FIG. 1. The disclosed embodiments assume strong sequential consistency for shared primitives. However, as would be appreciated by one of skill in the art, the notion of certified concurrent layer can potentially be applied to a more general setting. Further embodiments disclosed herein apply the notion of certified concurrent layers to smart contracts.

1. Overview

The disclosed embodiments introduce a layer-based approach to formally specify, certify, and compose these (concurrent) layers. This approach provides a technical solution to the problems of 1) untangling the complexities of module dependencies and interleaving, and 2) verifying different parts independently and locally at the layers they belong to.

FIG. 3 depicts exemplary code for using a lock to protect a critical section of a program. In this example, the client program P has two threads running on two different CPUs; each thread makes one call to the primitive foo provided by the concurrent layer interface $L_2$. The interface $L_2$ is implemented by the concurrent module $M_2$, which in turn is built on top of the interface $L_1$. The method foo calls two primitives f and g in a critical section protected by a lock. The lock is implemented over the interface $L_0$ using a ticket lock algorithm in module $M_1$. The lock maintains two integer variables n (the "now serving" ticket number) and t (i.e., next ticket number). The lock acquire method acq fetches-and-increments the next ticket number (by FAI_t) and spins until the fetched number is served. The lock release method rel increments the "now serving" ticket number by inc_n. These primitives are provided by $L_0$ and implemented using x86 atomic instructions. $L_0$ also provides the primitives f and g that are later passed on to $L_1$, as well as a no-op primitive hold called by acq to announce that the lock has been taken.

Certified Abstraction Layers

A certified sequential abstraction layer can be described by a predicate $L' \vdash_R M:L$ plus a mechanized proof object for the predicate, showing that the layer implementation M, built on top of the interface L' (which we call the underlay interface), indeed faithfully implements the desirable interface L above (which we call the overlay interface) via a simulation relation R. Consistent with disclosed embodiments, the implementation M can be a program module written in assembly (or C). A layer interface L can consist of a set of abstract states and primitives. An abstract layer machine based on L can be the base assembly (or C) machine extended with abstract states and primitives defined in L. The implements relation denotes ($\subseteq R$) a forward simulation with the (simulation) relation R. A certified layer can enforce a contextual correctness property: a correct layer can be like a "certified compiler," converting any safe client program P running on top of L into one that has the same behavior but runs on top of L' (i.e., by "compiling" abstract primitives in L into their implementation in M). The behavior of the layer machine based on L can be denoted as $[[\cdot]]_L$. The correctness property of $L' \vdash R \ M:L$ can then be written as "$\forall P.[[P \oplus M]]_L \subseteq_R [[P]]_L$" where $\oplus$ denotes a linking operator over programs P and M.

Certified Concurrent Layers

Consistent with disclosed embodiments, each layer interface L can be parameterized with a "focused" thread set A (where $A \subseteq D$ and D is the domain of all thread/CPU IDs). The layer machine based on a concurrent layer interface L[A] specifies the execution of threads in A. In some aspects, threads outside A can be considered the environment. As a non-limiting example, in FIG. 3 the domain D is {1, 2}. When {1} is the focused thread set, the environment contains thread 2. As used herein, L[{i}] may be abbreviated as L[i], where $i \in D$ for readability. A concurrent layer interface can extend its sequential counterpart with a set of abstract shared primitives and a global log l. Unlike calls to thread-local primitives which may not be observable by other threads, each shared primitive call (together with its arguments) can be recorded as an observable event appended to the end of the global log. For example, FAI_t (see FIG. 3) called from thread i takes a log "1" to a log "1•(i.FAI_t)," wherein the symbol "•" denotes appending the event (i.FAI_t) to the log.

Figure 13A:
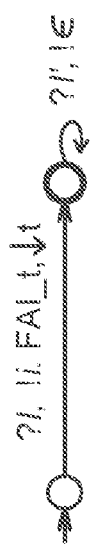
FIG. 13A-G depict exemplary strategies according to a game-theoretic concurrency framework.

The disclosed embodiments include a compositional (operational) model based upon ideas from game semantics that defines the semantics of a concurrent program P in a generic way. The compositional model frames each run of a program P over L[D] as a game involving members of D (plus a scheduler). According to this framework, each participant $i \in D$ contributes its play by appending events into the global log l. Such a participant has a strategy $\varphi_i$, which can be a deterministic partial function from the current log l to the next move of the participant $\varphi_i(l)$ whenever the last event in l transfers control back to i. For example, suppose thread i only invokes FAI_t, its strategy $\varphi_i$ can be represented as the automaton depicted in FIG. 13A.

In this non-limiting depiction, the global log is equal to 1 when control is transferred to i (denoted as "?l"). Thread i first generates the event i.FAI_t (denoted as "!i.FAI_t") and returns the ticket number t (calculated from 1). It then becomes idle (denoted as a reflexive edge labeled with ?l',!$\epsilon$) and will not produce any more events. The ticket number t is calculated by a function that counts the fetch-and-increment events in l. As used herein, such functions that reconstruct the current shared state from the log are called replay functions. The scheduler (denoted as $\varphi_0$) acts as a judge of the game. At each round, it picks one thread to make a move (and generate events) using its strategy. The behavior of the whole layer machine (denoted as "$[[\cdot]]_{L[D]}$") is then just the set of logs generated by playing the game under all possible schedulers. When focusing on a subset of threads A, the semantics (or execution) of the (concurrent) layer machine based on an interface L[A] can be defined over its set of valid environment contexts. Each environment context (denoted as E) provides a strategy for its "environment," i.e., the union of the strategies by the scheduler plus those participants not in A.

Figure 4:
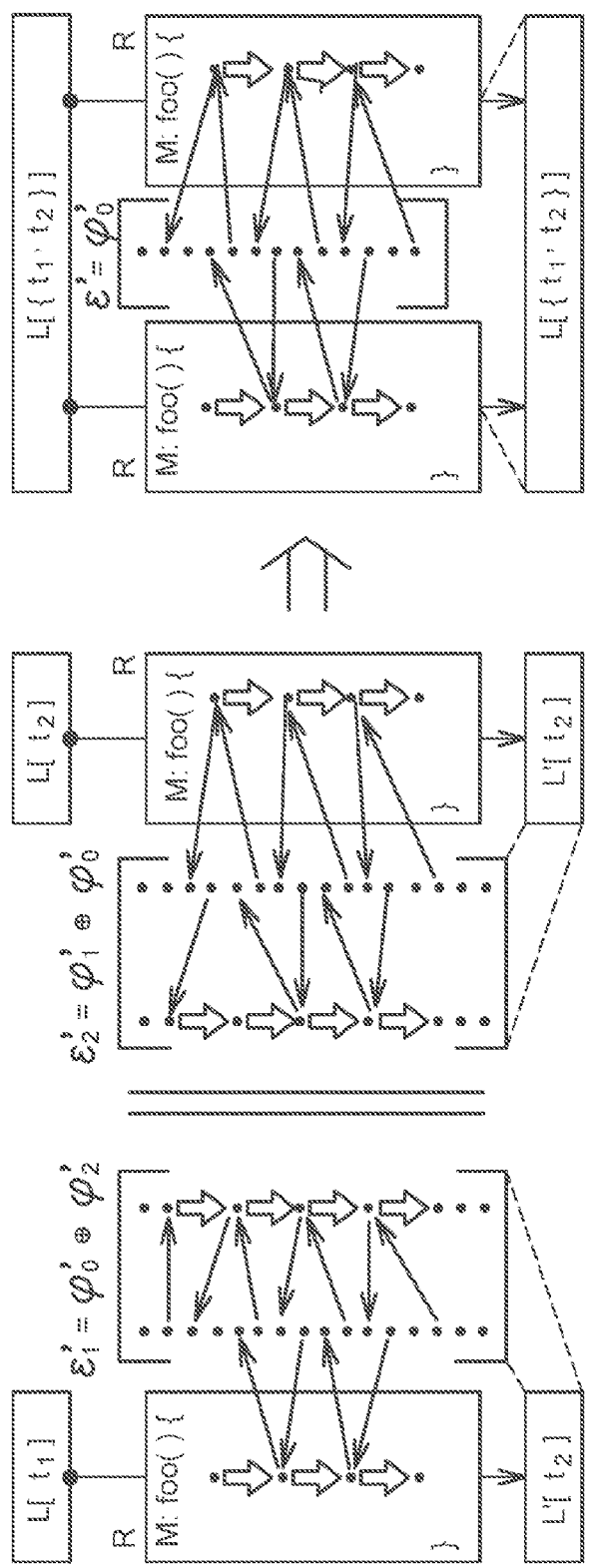
FIG. 4 depicts function call behavior of an exemplary system with two threads ($t_1$ and $t_2$) and a scheduler.

FIG. 4 shows an exemplary system with two threads ($t_1$ and $t_2$) and a scheduler. Method foo can run on top of Layer $L[t_1]$, which is implemented by $L'[t_1]$ under a specific environment context $E'_1$. Here, $E'_1$ is the union of the strategy $\varphi'_0$ for the scheduler and $\varphi'_2$ for thread $t_2$. Method foo can also run on top of Layer $L[t_2]$, which is implemented by $L'[t_2]$ under a specific environment context $E'_2$. Here, $E'_2$ is the union of the strategy $\varphi'_0$ for the scheduler and $\varphi'_1$ for thread $t_1$. FIG. 4 also depicts the interleaved execution of two invocations to foo over $L'[\{t_1, t_2\}]$, where the environment context E' is just the scheduler strategy $\varphi'_0$. In this example, consistent with disclosed embodiments, the execution of P over L[A] is deterministic when given an environment context E which also contains a specific scheduler strategy. The concurrent machine will run P when the control is transferred to any member of A, but will ask E for the next move when the control is transferred to the environment. To enforce the safety of environmental moves, each layer interface can specify a set of valid environment contexts. Consistent with disclosed embodiments, this set of valid environment contexts corresponds to a generalized version of the "rely" (or "assume") condition in rely-guarantee-based reasoning. Each layer interface can also provide one or more "guarantee" condition, which can be expressed as invariants over the global log.

Local Layer Interface

As a non-limiting example, the focused thread set may be a singleton {i}. Since the environmental executions (including the interleavings) are all encapsulated into the environment context, L[i] is actually a sequential-like (or local) interface parameterized over E. Before each move of a client program P over this local interface, the layer machine first repeatedly asks E for environmental events until the control is transferred to i. It then makes the move based on received events. Thus, the semantics of running P over L[i] (denoted as $(|P|)_{L[i]}$) can be analyzed as a strategy. The correctness property asserting that a concurrent module on top of a local layer interface indeed satisfies its specification (i.e., a more abstract strategy) can be defined by the strategy simulation via a simulation relation R for logs.

As used herein, a strategy $\varphi$ is simulated by another strategy $\varphi'$ with a simulation relation R (denoted $\varphi \leq_R \varphi'$) if and only if for any two related (by R) environmental event sequences and any two related initial logs, we have that for any log l produced by $\varphi$, there must exist a log l' that can be produced by $\varphi'$ such that l and l' also satisfy R. Consider the acq method of the ticket lock module $M_1$ running over $L_0[i]$ (as shown in FIG. 3). Its specification can be represented as the strategy $\varphi'_{acq}[i]$ depicted in FIG. 13B.

Figure 13B:
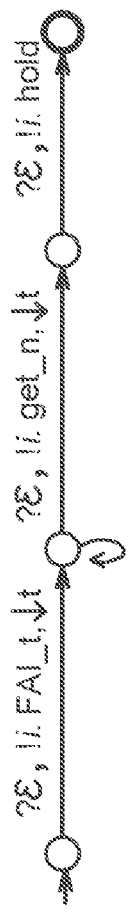

As depicted in FIG. 13B, querying the environment context E can be denoted ?E. We can prove the relationship $(|acq|)_{L_0[l]} \leq_{id} \varphi_{acq}'[i]$, where $(|acq|)_{L_0(i)}$ denotes running acq over the layer $L_0$ with i as the focused thread set. The simulation relation id is as follows: for any equal E and equal initial state, if φ' acq[i] takes one step, acq can take one (or more) steps to generate the same event and the resulting states are still equal. This correctness property can also be used to define certified concurrent layers:

$$L_0[i] \vdash_{id} acq : \varphi_{acq}'[i] := (|acq|)_{L_0[i]} \leq_{id} \varphi_{acq}'[i]$$

Here acq, built on top of underlay interface $L_0$, focused on thread set i, implementing the strategy $\varphi'_{acq}[i]$, is defined as equivalent to running acq over the layer $L_0$ with i as the focused thread set. Let $M_1 := acq \oplus rel$ and $L'_1[i] := \varphi_{acq}[i]$ '$\oplus \varphi_{rel}$ [i]'. By showing that the lock release satisfies its specification (i.e., $L_0[i] \vdash_{id} rel : \varphi_{rel}'[i]$) and by applying a horizontal composition rule described herein, we have predicate (1):

$$L_0[i] \vdash_{id} M_1 : L_1'[i] := (|M_1|)_{L_0[i]} \leq_{id} L_1'[i]$$

Here a certified layer implementation $M_1$, built on top of underlay interface $L_0$ (focused on thread set i), implementing overlay interface $L'_1$ (focused on thread set i), is defined as, via the simulation relationship id, equivalent to running interface $L'_1$ with i as the focused thread set. This notation can be extended to a set of strategies, such that each strategy of $L'_1[i]$ can simulate a corresponding one of $(|M_1|)_{L_0[i]}$.

Higher-Level Strategies

Figure 13C:

In some embodiments, although the specifications above (e.g., φ' acq[i]) are abstract (i.e., language independent), low-level implementation details and interleavings within the module may still exposed. For example, as depicted in FIG. 13B, $\varphi'_{acq}[i]$ reveals a loop that repeatedly interacts with the environment to check the serving ticket number. Consistent with disclosed embodiments, the strategies of L'1[i] can be refined to a higher-level interface L1[i] that is atomic, as depicted in FIG. 13C.

Here, $\varphi_{acq}[i]$ simply queries E and produces a single event i.acq. It then enters a so-called critical state (marked as gray) to prevent losing the control until the lock is released. Thus, there is no need to ask E in critical state. Consistent with disclosed embodiments, a strategy simulation between $L'_1[i]$ and $L_1[i]$ can be shown by posing the following "rely" (i.e., validity) conditions R over the environment context of $L'_1[i]$:

$L'_1$ [i].$R_{hs}$: the scheduler strategy $\varphi'_{hs}$ must be fair.

$L'_1$ [i].$R_j$(j≠i):lock-related events generated by $\varphi_j$ must follow $\varphi_{acq}'[j]$ and $\varphi_{rel}'[j]$, and the held locks will eventually be released.

These conditions ensure that the loop (waiting for the ticket to be served) in φ' acq[i] terminates. Also, they can be used to prove that each run of $L'_1[i]$ is captured by $L_1[i]$. As a non-limiting example, if the scheduler strategy $\varphi'_{hs}$ schedules as "1, 2, 2, 1, 1, 2, 1, 2, 1, 1, 2, 2," running P (see FIG. 3) over L'1[D] generates the log:

$$l_g' := (1 \cdot FAI\_t) \cdot (2 \cdot FAI\_t) \cdot (2 \cdot get\_n) \cdot (1 \cdot get\_n) \cdot (1 \cdot hold) \cdot (2 \cdot get\_n) \cdot (1 \cdot f) \cdot (2 \cdot get\_n) \cdot (1 \cdot g) \cdot (1 \cdot inc\_n) \cdot (2 \cdot get\_n) \cdot (2 \cdot hold)$$

This interleaving can be captured by a higher-level scheduler $\varphi_{hs}$ producing "1, 2" (as thread 1 is in the critical state while holding the lock), and the generated log at $L_1[D]$ is:

$$l_g := (1 \cdot acq) \cdot (1 \cdot f) \cdot (1 \cdot g) \cdot (1 \cdot rel) \cdot (2 \cdot acq)$$

Although logs (and events) at these two layers are different, the order of lock acquiring and the resulting shared state (calculated from logs by replay functions) are the same. By defining the relation R1 over logs as mapping events i.acq to i.hold, i.rel to i.inc_n and other lock-related events to empty ones, we can prove:

$$L_1'[i] \leq_{R_1} L_1[i]$$

Then by predicate (1) and the parallel composition rule of FIG. 9, we have that $$L_0[i] \vdash_{id \cdot R_1 = R_1} M_1 : L_1[i]$$

Figure 13D:
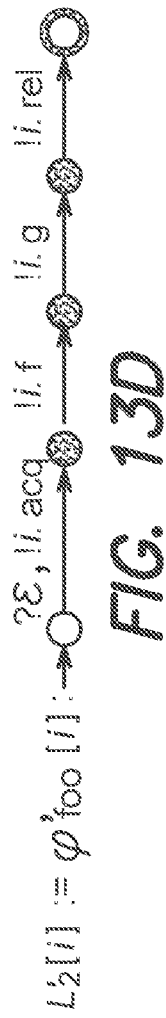
Figure 13E:
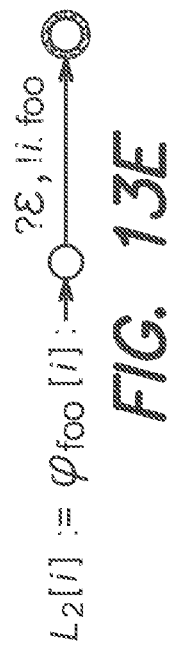

Similarly, for the foo method (i.e., $M_2$ in FIG. 3), we can also introduce a low-level strategy $\varphi'_{foo}[i]$ shown in FIG. 13D as the first step. Then we prove that a high-level atomic interface $\varphi_{foo}$, shown in FIG. 13E simulates (with some R2) $\varphi'_{foo}$, which in turn simulates foo:

$$L_2'[i] \leq_{R_2} L_2[i] \vdash_{id} M_2 : L_2'[i]$$

Based on $L'_2[i]$, we can derive the "guarantee" condition $\mathcal{G}$ of the thread saying that held locks are always released within three steps, which is consistent but more concrete than the rely condition $\mathcal{R}$ defined above.

Parallel Layer Composition

Consistent with disclosed embodiments, two layer interfaces $L[t_1]$ and $L[t_2]$ are compatible if the guarantee $\mathcal{G}$ of each interface implies the other interface's rely conditions $\mathcal{R}$. A general parallel layer composition rule follows from the compositional model described herein: if $L'[t_1]$ is compatible with $L'[t_2]$, $L[t_1]$ is compatible with $L[t_2]$, and $L'[t] \vdash_R M : L[t]$ holds for every t∈{$t_1,t_2$}, then we have $L'[\{t_1, t_2\}] \vdash_R M : L[\{t_1,t_2\}]$. FIG. 4 depicts composing certified local layers (one for $t_1$ and another for $t_2$) to build a certified layer for the entire machine (with $t_1$ and $t_2$ both focused).

Thread-Safe CompCertX and Layer Linking

As disclosed above, the local layer interface is sequential-like, so a compiler (e.g., the CompCertX compiler, or the like) can be modified to be thread-safe by merging the stack frames of threads on the same CPU into a single stack. In some embodiments, such a thread-safe compiler can be configured to compile certified C layers into certified assembly layers.

Figure 5:
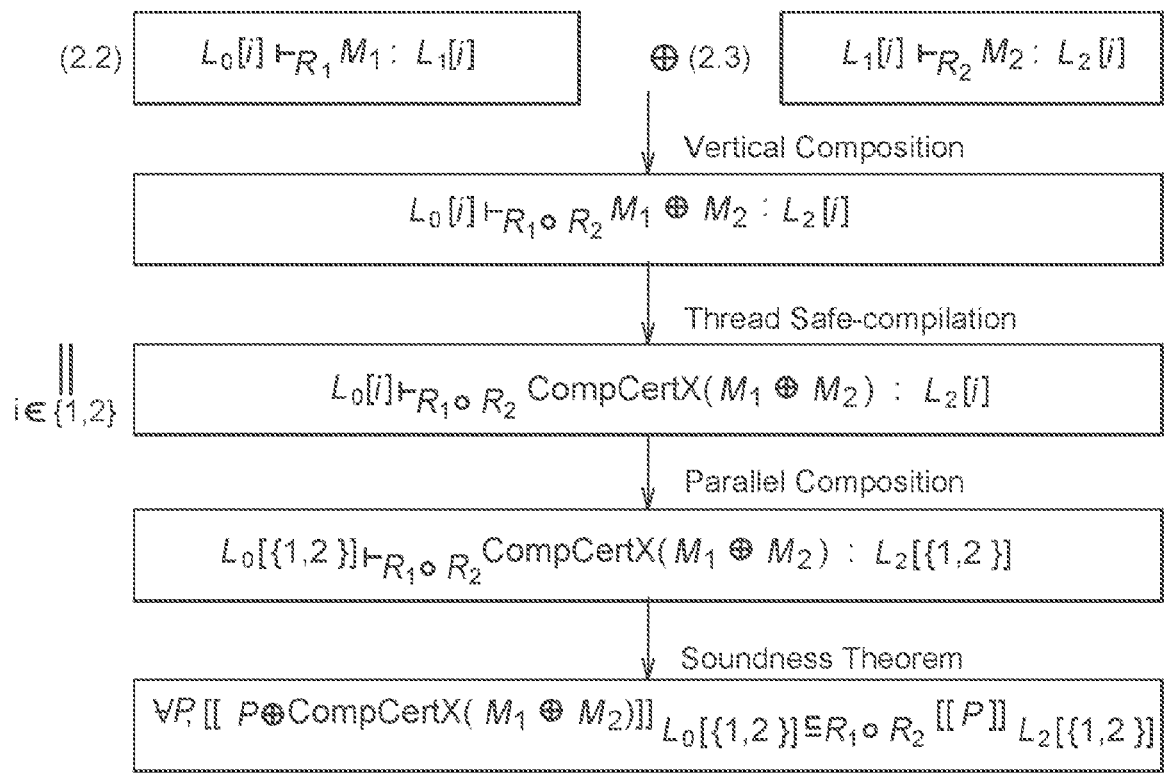
FIG. 5 depicts using disclosed composition rules to construct a certified concurrent layer for the entire system from certified assembly layers.

FIG. 5 depicts using disclosed composition rules to construct a certified concurrent layer for the entire system from certified assembly layers. The composition rules can include the horizontal, vertical, and the parallel layer composition rules discussed herein. The relation $L'[D] \vdash_R M : L[D]$ implies the following soundness theorem, which enforces a contextual refinement property. This theorem proves that, for any client program P, we have that for any log l in the behavior $[[P \oplus M]]_{L'[D]}$, there must exist a log l' in the behavior $[[P]]_{L[D]}$ such that l and l' satisfy R.

$$L'[D] \vdash_R M : L[D] \Rightarrow \forall P, [\![P \oplus M]\!]_{L'[D]} \subseteq_R [\![P]\!]_{L[D]}$$

2. Concurrent Layer Interface and Calculus

The following section discusses the application of the disclosed compositional model to the x86 multicore hardware.

2.1 Multiprocessor Machine Model

The multiprocessor machine model $\mathbb{M}_{x86}$ is defined by the machine state, the transition relation, and the memory model.

Machine Model

FIG. 7 depicts the machine state for the concurrent machine model and the concurrent layer interface. In some embodiments, the state of $\mathbb{M}_{x86}$ can be denoted as a tuple "$s := (c, f_\rho, m, a, l)$," where the components can be the current CPU ID c, all CPUs' private states $f_p$ (i.e., a partial map from CPU ID to private state ρ), a shared memory state m, an abstract state a, and a global event log l. The private state ρ can include CPU-private memory pm (invisible to other CPUs) and a register set rs. The shared memory state m can be shared among all CPUs. Each location b in both local and shared memories can contain a memory value v. The abstract state a can be generally used in our layered approach to summarize in-memory data structures from lower layers. Such abstract states are not ghost states, because they can affect program execution when making primitive calls. The global log l can be a list of observable events, recording all shared operations that affect more than one CPU. Events generated by different CPUs are interleaved in the log, following the actual chronological order of events. This particular framework is not intended to be limiting. Other frameworks may also be used, consistent with this disclosure.

Transition Relation

In the non-limiting example provided, the machine $M_{x86}$ has two types of transitions that are arbitrarily and nondeterministically interleaved: program transitions and hardware scheduling. Consistent with disclosed embodiments, program transitions can be one of three possible types: instruction executions, private primitive calls, and shared primitive calls. The first two types can be "silent", in that they do not generate events. Shared primitives, on the other hand, can provide the only means for accessing and appending events to the global log. The transitions for instructions only change $\rho$, pm, and m, and are defined according to standard operational semantics for C or x86-assembly (e.g., resembling the operational semantics used in CompCert). Primitive calls are specific to our style of verification: they directly specify the semantics of function f from underlying layers as a relation $\sigma_f$. This relation may be defined using a theorem prover (e.g., Coq or the like). Such a relation can specify how the state is updated after f is called with the given arguments and what value f returns.

Hardware Scheduling

Consistent with disclosed embodiments, hardware scheduling transitions can change the current CPU ID c to some ID c' (recorded as a scheduling event). Such transitions can be arbitrarily interleaved with program transitions. In this example, at any step, $M_{x86}$ can take either a program transition staying on the current CPU, or a hardware scheduling to another CPU. The behavior of a client program P over this multicore machine (denoted as $[[P]]_{M_{x86}}$) is a set of global logs generated by executing P via these two kinds of transitions.

Memory Model

In this non-limiting example, a "push/pull" memory model may be used for the shared memory m (the private memory is separately handled in $\rho$), which encapsulates the shared memory operations into push/pull events and can detect data races. However, this particular model is not intended to be limiting, as other memory model may be used, consistent with disclosed embodiments.

In this non-limiting example, each shared memory location b can be associated with an ownership status in the abstract state a, which can only be manipulated by two shared primitives called pull and push. The pull operation can modify the ownership from "free" to "owned by c", after which shared memory accesses can be performed by CPU c. The push operation can free the ownership and can record its memory updates in the log. FIG. 6 shows the specification for the strategy $\sigma_{pull}{}'$, where r{i:v} denotes updating the record r at field i with value v.

If a program tries to pull a not-free location, or tries to access or push to a location not owned by the current CPU, a data race may occur and the machine risks getting stuck. One technological improvement in concurrent program verification realized by the disclosed embodiments is the ability to prove that a program is data-race free. In this example, we prove that the program is data-race free by showing that the program does not get stuck.

2.2 Concurrent Layer Interface

In this non-limiting example, the concurrent layer interface L[A] for subset of CPUs A can be defined as a tuple denoted ($\mathcal{L}, \mathcal{R}, \mathcal{G}$ $\mathcal{R}$ $\mathcal{G}$). The machine based on this concurrent interface can be "open" in the sense that it may capture a subset of CPUs and then be composed with any acceptable execution of the remainder of the CPUs. The domain of the private state map $f_\rho$ can also be this captured (or focused) subset. The interface L[A] equips this open machine with a collection of primitives that are defined in $\mathcal{L}$ and can be invoked at this level, the rely condition $\mathcal{R}$ that specifies a set of acceptable environment contexts, and the guarantee condition $\mathcal{G}$ that the log l should hold. The instruction transitions are defined as before, but all hardware scheduling is replaced by queries to the environment context.

Environment Context

In some embodiments, $\varepsilon$ can be a partial function from a CPU ID to its strategy $\varphi$. As described herein, a strategy can be an automata that generates events in response to given logs. When focusing on a CPU set A, all the observable behaviors of the hardware scheduling and the program transitions of other CPUs can be specified as a union of strategies (i.e., $\varepsilon$). In some embodiments, whenever there is a potential interleaving the machine can query $\varepsilon$ about the events from other CPUs (and the scheduler).

Consistent with disclosed embodiments, the environmental events cannot influence the behaviors of instructions and private primitive calls. This lack of influence can also apply to shared memory read/write, because the push/pull memory model encapsulates other CPUs' effects over the shared memory into push/pull events. Thus, during the execution of instructions and private primitives, it may be unnecessary to query $\varepsilon$, and the appended environmental events will be received by the next so-called query point, that is, the point just before executing shared primitives.

To to continue this example, at each query point, the machine may repeatedly query $\varepsilon$. Each query takes the current log l as the argument and returns an event (i.e. $\varepsilon$(c', l),) from a CPU c' not in A. That event is then appended to l, and this querying continues until there is a hardware transition event back to A (assuming the hardware scheduler is fair). The entire process of extending l with multiple events from other CPUs can be denoted $\varepsilon$[A,l].

As described herein, the $\mathcal{R}$ and $\mathcal{G}$ of the layer interface can specify the validity of the environment context and the invariant of the log (containing the locally-generated events). After each step of threads in A over interface L[A], the resulting log l must satisfy the guarantee condition L[A]. $\mathcal{G}$ (e.g., l∈L[A]. $\mathcal{G}$ (c) if c is the current CPU ID indicated by l). In this example, the guarantee conditions can depend on the validatity of the events generated locally and the validity of the environment context. The rely condition L[A]. $\mathcal{R}$ can specify a set of valid environment contexts, which take valid input logs and return a valid list of events.

CPU-Local Layer Interface

As used herein, L[c] denotes a CPU-local layer interface focusing on a single CPU c. The machine state of layer L focused on CPU c can be ($\rho$,m,a,l), where $\rho$ can be the private state of the CPU c and m can be a local copy of the shared memory.

FIG. 8 depicts exemplary specifications for push/pull primitives of L[c] that deliver the effects of shared memory operations. In some embodiments, the local copy of the shared memory m can only be accessed locally by c. The primitives push/pull of L[c] "deliver" the effects of shared memory operations, depending on a replay function $\mathbb{R}_{shared}$ to reconstruct the shared memory value v for some location b and check the well-formedness (i.e., no data race occurs) of the resulting log. These exemplary specifications are not intended to be limiting.

Figure 13F:
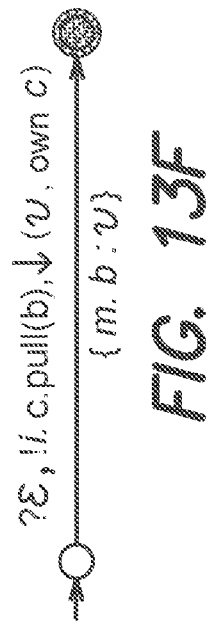

Since $\rho_{pull}$ is parameterized with ε, it can also be viewed as the strategy with private state updates depicted in FIG. 13F. As depicted in this figure, the layer machine can enter a critical state after calling pull by holding the ownership of a shared location. The layer machine can exits the critical state by invoking push to free the ownership of the shared location.

2.3 Concurrent Layer Calculus

The disclosed embodiments can use, include, and/or implement the layer calculus shown in FIG. 9 to build and compose concurrent layers L[A]⊢$_R$ M:L'[A]. In FIG. 9, "φ" stands for an empty program module, "⊕" computes the union of two modules (or two layers' primitive collections), and "(i↦·)" is a singleton map with a pointer or location i as its domain.

Composition Rules

In some embodiments, the vertical composition rule (Vcomp) depicted in FIG. 9, can enable verification of the modules M and N (where N may depend on M) in two separate steps, while the horizontal composition rule (Hcomp) depicted in FIG. 9 can enable local reasoning for independent modules M and N belonging to the same level. Consistent with disclosed embodiments, these two composition rules can compose layers over the same CPU set. In some embodiments, these two composition rules can only compose layers over the same CPU set.

In some embodiments, layers on different CPUs can be composed by the parallel composition rule (Pcomp) when the simulation relations are the same, and both overlay and underlay interfaces are compatiable, as described herein. This compatibility is denoted as L[A]∥L[B]≈L[A∪B], and asserts that each guarantee condition of L[A] implies the corresponding rely condition of L[B] and vice versa. The composed interface L[A∪B] merges the primitives of two layers and is equipped with stronger guarantees and weaker rely conditions. The machine based on this composed layer interface only queries ε about the events not from A∪B.

Multicore Linking Theorem

By composing all the CPUs in the machine (denoted as the set D), the resulting layer interface does not depend on any environmental events except those from the hardware scheduler. We construct such a layer interface $L_{x86}[D]$ using the primitives provided by the hardware $\mathbb{M}_{x86}$. We can then prove a contextual refinement from $\mathbb{M}_{x86}$ to $L_{x86}[D]$ by picking a suitable hardware scheduler of $L_{x86}[D]$ for every interleaving (or log) of $\mathbb{M}_{x86}$. From the following multicore linking theorem, code verification over $L_{x86}[D]$ can be propagated down to the x86 multicore hardware $\mathbb{M}_{x86}$.

$$\forall P, [[P]]^{\mathbb{M}_{x86}} \subseteq_R [[P]]_{L_{x86}[D]}$$

This theorem states that for all programs P, the behavior of the multicore machine over P implements with the simulation relation R the behavior of P over the layer interface $L_{x86}$ focused on the set of CPUs D.

Function Rule

Consistent with disclosed embodiments, the function rule (Fun) depicted in FIG. 9 can be used to build layers by proving a simulation relationship between strategies. Two most common patterns, fun-lift and log-lift, are described above with regards to FIGS. 13C-Xe. As discussed in relation to those figures, the fun-lift pattern abstracts a concrete implementation into a low-level strategy without changing the potential interleaving. In this pattern, language dependent details (e.g., silent moves changing temporal variables) are hidden and data representation details (e.g., memory values carried by push events) are replaced with abstract state values. The log-lift pattern always involves the events merging and the interleavings shuffling to form an atomic interface.

3. Building Certified Multicore Layers

The disclosed embodiments can be used to verify shared objects, as shown in the following examples. In these example, all layers are built upon the CPU-local layer interface $L_{x86}[c]$.

3.1 Spinlocks

As would be appreciated by those of skill in the art, spinlocks (e.g., the ticket lock algorithm described above) are a basic synchronization method for multicore machines. Spinlocks can be used as building blocks for shared objects and more sophisticated synchronizations.

A spinlock can enforce mutual exclusion by restricting CPU access to a memory location b. Therefore, lock operations can be viewed as "safe" versions of push/pull primitives. For example, when the lock acquire for b succeeds, the corresponding shared memory is guaranteed to be "free", meaning that it is safe to pull the contents to the local copy at this point (line 4 in FIG. 10). In this non-limiting example, the disclosed embodiments can be used to build layers for the spinlock in FIG. 10, which uses a ticket lock algorithm (query points are denoted as "Δ" in the pseudocode depicted in FIG. 10).

Bottom Interface Lx86[c]

In this example, the CPU-local interface $L_{x86}[c]$ can be extended with shared primitives FAI_t, get_n, and inc_n. These primitives can directly manipulate the lock state t(next ticket) and n(now serving ticket) via x86 atomic instructions. The lock state can be calculated by a replay function $\mathbb{R}_{ticket}$ counting c.FAI_t and c.inc_n events.

Fun-Lift to $L_{lock\_low}[c]$

As discussed herein, a strategy simulation can be proven for this low-level interface $L_{lock\_low}[c]$ (which may be the same as L'1[c], described above). Note that $(lacq!)_{L_{lock\_low}[c]}$ contains extra silent moves (e.g., assigning myt, line 2 in FIG. 10) compared with $\varphi'_{acq}[c]$. In some embodiments, the simulation relation $R_{lock}$ not only states the equality between logs but also maps the lock state in the memory to the state calculated by the replay function $\mathbb{R}_{ticket}$. The simulation relation must also handle potential integer overflows for t and n. Consistent with disclosed embodiments, as long as the total number of CPUs (i.e., #CPU) in the machine is less than 2^32 (a number dependent on the definition of an unsigned integer for this platform), the mutual exclusion property will not be violated even with overflows.

Log-Lift to $L_{lock}[c]$

As discussed above, the acq and rel primitives can be refined to an atomic interface, so that each invocation produces exactly one event in the log. These atomic lock interfaces (or strategies) can resemble pull/push specifications, except that the atomic lock interfaces are safe (i.e., will not get stuck). This safety property can be proved using rely conditions $L_{lock}[c]$. $\mathcal{R}$ saying that, for any CPU c'≠c, its c'.acq event must be followed by a sequence of its own events (generated in the critical state) ending with c'.rel. The distance between c'.acq and c'.rel in the log is less than some number n.

Consistent with disclosed embodiments, aliveness property (i.e., starvation-freedom), can be established by enforcing the fairness of the scheduler as a requirement in the rely conditions that any CPU be scheduled within m steps. Then it can be shown that the while-loop in acq terminates in "n×m×#CPU" steps.

3.2 Shared Queue Object

As would be appreciated by those of skill in the art, shared queues are widely used in concurrent programs (e.g., as the list of threads in a scheduler, etc). The disclosed embodiments improve upon prior techniques by permitting verification of shared queue objects without requiring inlining of a lock implementation and duplicating lock-related proofs. The following non-limiting example demonstrates using concurrent abstraction layers to verify a shared queue module using fine-grained locks.

Fun-Lift to $L_q[c]$

In this non-limiting example, the shared queues are implemented as doubly linked lists, and are protected by spinlocks. For example, the dequeue (deQ) operation first acquires the spinlock associated with queue i, then performs the actual dequeue operation in the critical state, and finally releases the lock. Consistent with disclosed embodiments, verifying deQ may proceed by verifying an intermediate function deQ_t which contains code that performs the dequeue operation over a local copy, under the assumption that the corresponding lock is held. Since no environmental queries are needed in the critical state, building concurrent layers for deQ_t is similar to building a sequential layer. The abstract states a.tcbp and a.tdqp can represent the thread control block (i.e.,tcb) array and the thread queue array. The abstract tdqp can be a partial map from the queue index to an abstract queue, which can be represented as a list of tcb indices. Consistent with disclosed embodiments, deQ_t can be shown to satisfy its specification $\sigma_{deQ\_t}$, as shown in FIG. 11.

Fun- and Log-Lift to $L_q$ high[c]

Figure 13G:
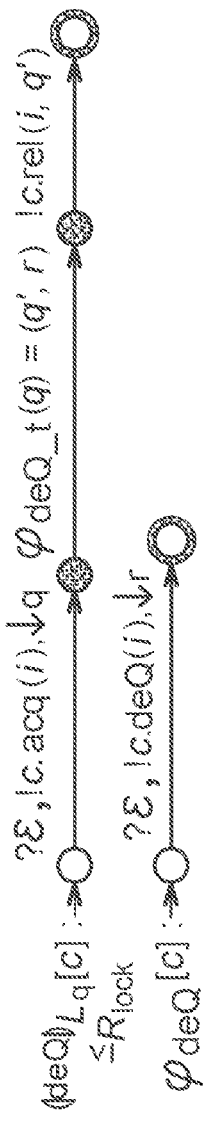

Consistent with disclosed embodiments, the deQ function that wraps deQ_t with lock primitives can be shown to meet an atomic interface. With a simulation relation Riock that merges two queue-related lock events (i.e., c.acq and c.rel) into a single event c.deQ at the higher layer, the strategy simulation depicted in FIG. 13G can be shown.

Building Certified Multithreaded Layers

Multithreaded programs have to deal with interleavings triggered by not only the hardware scheduler but also the explicit invocation of thread scheduling primitives. The disclosed embodiments include certified layers dealing with scheduling primitives, an improved approach equipping thread-local layer interfaces with compositional rules, and a thread-safe compiler.

4.1 Certified Layers for Scheduling Primitives

Consistent with disclosed embodiments, the shared thread queues described above can support a layer interface $L_{btd}[c]$ that supports multithreading. At this layer interface, the transitions between threads can be done using scheduling primitives, implemented in a mix of C and assembly.

In a multithreaded setting, each CPU c has a private ready queue rdq and a shared pending queue pendq (containing the threads woken up by other CPUs). A thread yield sends the first pending thread from pendq to rdq and then switches to the next ready thread. The setting can also include one or more shared sleeping queues slpq. When a sleeping thread is woken up, it will be directly appended to the ready queue if the thread belongs to the currently-running CPU. Otherwise, it will be appended to the pending queue of the CPU it belongs to.

Figure 14C:
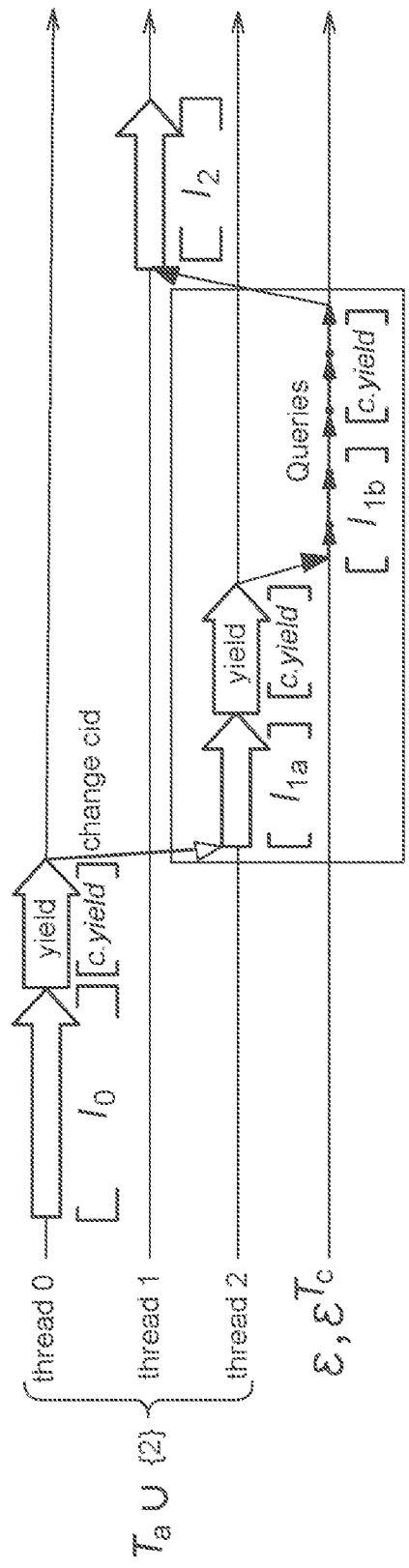

Thread switching can be implemented by the context switch function cswitch, which saves the current thread's kernel context (e.g., ra, ebp, ebx, esi, edi, esp, discussed above), and loads the context of the target thread. This cswitch (invoked by yield and sleep) can only be implemented at the assembly level, as it does not satisfy the C calling convention. A scheduling primitive, such as yield, can first query E to update the log, appends its own event, and then invokes cswitch to transfer the control, as shown in FIG. 14A.

In some embodiments, this layer interface can introduce three new events c.yield, c.sleep(i,lk) (sleep on queue i while holding the lock lk), and c.wakeup(i) (wakeup the queue i). These events record the thread switches, which can be used to track the currently-running thread by a replay function $\mathbb{R}_{sched}$.

4.2 Multithreaded Layer Interface

The CPU-local interface $L_{btd}[c]$ can be configured to capture the execution of the whole thread set of CPU c and does not support thread-local verification. The disclosed embodiments can improve upon prior methods by permitting formal reasoning about each thread separately and subsequent composition of the proofs to obtain a global property. Such improvements can be realized by the introduction of a new layer interface that is compositional and only focuses on a subset of thread running on CPU c.

Let $T_c$ denote the whole thread set running over CPU c. Based upon L[c], a multithreaded layer interface $L[c][T_A]:=(L[c].\mathcal{G}, L[c].\mathcal{R} \cup \mathcal{R}_A, L[c].\mathcal{G}_A)$ can be constructed. This multithreaded layer interface can be parameterized over a focused thread set $T_A \subseteq T_c$. Besides $T_A$, strategies of other threads running on c form a thread context $\varepsilon^t$. Rely conditions of this multithreaded layer interface extend L[c].$\mathcal{R}$ with a valid set of $\varepsilon^t$ and guarantee conditions replace L[c].$\mathcal{G}$ (c) with the invariants held by threads in $T_A$. Since our machine model does not allow preemption, $\varepsilon^t$ will only be queried during the execution of scheduling primitives, which have two kinds of behaviors depending on whether the target thread is focused or not.

In a non-limiting example, consider the execution shown in FIG. 14B with $T_A=\{0,1\}$. Whenever an execution switches (by yield or sleep) to a thread outside of $T_A$ (i.e., the yellow yield in FIG. 14B), the execution takes environmental steps (i.e., inside the red box), repeatedly appending the events returned by the environment context ε and the thread context $\varepsilon^t$ to the log until a c.yield event indicates that the control has switched back to a focused thread. Whenever an execution switches to a focused one (i.e., the blue yield above), it will perform the context switch without asking ε/$\varepsilon^t$ and its behavior is identical to the one of $L_{btd}[c]$.

Composing Multithreaded Layers

Consistent with disclosed embodiments, multithreaded layer interfaces with disjoint focused thread sets can be composed in parallel (using an extended Pcomp rule) if the guarantee condition implies the rely condition for every thread. The resulting focused thread set is the union of the composed ones, and some environmental steps are "replaced by" the local steps of the other thread set. For example, if we compose $T_A$ in FIG. 14C with thread 2, the yield of thread 0 will then cause a switch to a focused thread. In this example, the event list $l_1$ generated by ε and $\varepsilon^t$ can be divided into two parts: $l_{1a}$·c.yield (generated by thread 2) and $l_{1b}$ (consisting of events from threads outside {0,1,2}).

Multithreaded Linking

When the whole $T_c$ is focused, all scheduling primitives fall into the second case and never switch to unfocused ones. Consistent with disclosed embodiments, the scheduling behaviors are equal to the ones of $L_{btd}[c]$. By introducing a multithreaded layer interface $L_{btd}[c][T_c]$ that contains all the primitives of $L_{btd}[c]$, we can prove the following multithreaded linking theorem:

$$L_{btd}[c] \leq_{id} L_{htd}[c][T_c]$$

This theorem guarantees that, once the multithreaded machine based on $L_{btd}[c][T_c]$ captures the whole thread set, the properties of threads running on top can be propagated down to the layer with concrete scheduling implementations.

4.3 Thread-Local Layer Interface

Figure 14D:
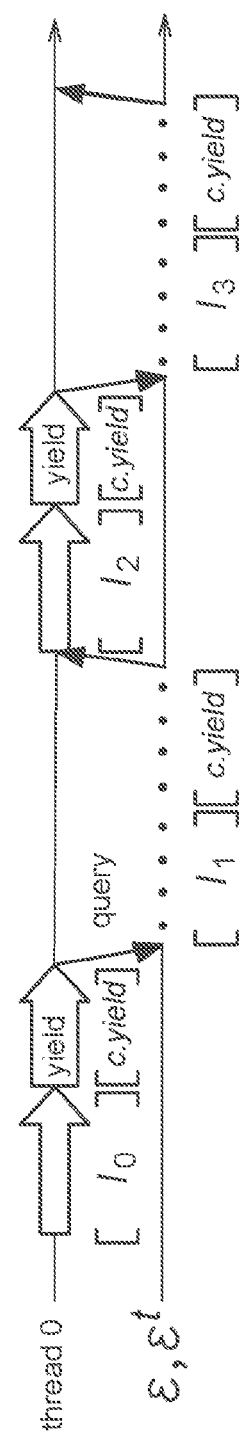

If a multithreaded interface L[c][t] only focuses on a single thread t∈$T_c$, then yield and sleep primitives always switch to an unfocused thread and then repeatedly query ε and ε' until yielding back to t, as shown in FIG. 14D.

Program specifications consistent with the disclosed embodiments are termination-sensitive. Therefore, the disclosed embodiments enable proofs that control returns to a focused thread set, improving upon prior analysis techniques. In some aspects, this proof can rely on the assumed fairness of the software scheduler and the requirement that every running thread gives up the CPU within a finite number of steps. Thus L[c][t] can be described as a "threadlocal" layer interface because scheduling primitives always end up switching back to the same thread. In this manner, the scheduling primitives do not modify the kernel context (i.e. ra, ebp, ebx, esi, edi, esp) and effectively act as a "no-op" with respect to the thread, except that the shared log gets updated. In this manner, the scheduling primitives can satisfy C calling conventions.

4.4 Queuing Lock

Consistent with disclosed embodiments, additional synchronization toolkits, such as a queuing lock (discussed above with regards to FIG. 12) can be built upon the thread-local layer interfaces. In some embodiments, queuing locks may be configured to put waiting threads to sleep to avoid busy spinning. C implementation of queuing locks can use both spinlocks and low-level scheduler primitives (i.e., sleep and wakeup) in some embodiments. Formal verification of the queuing lock can be accomplished by decomposing the verification task into multiple layers above $L_{btd}$[c][t].

Consistent with disclosed embodiments, the correctness property of a queuing lock can consist of two parts: mutual exclusion and starvation freedom. The lock implementation (shown in FIG. 12) can be mutually exclusive because the busy value of the lock (ql_busy) is always equal to the lock holder's thread ID. In this non-limiting example, the busy value can be set either by the lock requester when the lock is free (line 6 of FIG. 12) or by the previous lock holder when releasing the lock (line 12). With the atomic interface of the spinlock, the starvation-freedom proof of queuing lock can be established, in part, by proving termination of the sleep primitive call (line 4). Because all the lock holders will eventually release the lock, all the sleeping threads will be added to the pending queue or ready queue within a finite number of steps. Thus, sleep will terminate thanks to the fair software scheduler. Note that all these properties proved at the C level can be propagated down to the assembly level using a thread-safe compiler (e.g., CompCertX or the like).

4.5 Thread-Safe Compilation and Linking

The disclosed embodiments include a compiler adapted to handle programs that call scheduling primitives (e.g., CompCertX verified separate compiler). As described above, the disclosed embodiments use a thread-local layer interface to assignment of C style specifications to scheduling primitives (yield and sleep) partially implemented in assembly. This allows formal verification of the code of each thread at the C style specification level over $L_{btd}[c][t]$. Individual threads can then be composed into programs on $L_{btd}[c]$ according to the multithreaded linking theorem disclosed above.

The disclosed embodiments further include a memory model that can ensure the compiled programs at the assembly level satisfy the assumptions of the parallel composition rule discussed herein. Existing compilers (e.g., CompCert or the like) may, whenever a function is called, allocated a fresh memory block in the memory for its stack frame. Consequently, on top of the thread-local layer $L_{btd}[c][t]$, a function called within a thread may allocate its stack frame into the thread-private memory state, and conversely, a thread is never aware of any newer memory blocks allocated by other threads. However, on $L_{btd}[c]$, all stack frames have to be allocated in the CPU-local memory (i.e., thread-shared memory) regardless of which thread they belong to. All such stack frames must therefore be accounted for in the thread composition proof.

The disclosed embodiments address this problem through a memory extension that removes the access permissions of some memory blocks. Consistent with disclosed embodiments, the semantics of the thread-local yield primitive are modified the so that it allocates enough empty memory blocks as placeholders for the stack frames of the other threads. These empty blocks lack access permissions. Denoting the total number of blocks in m as nb(m) and liftnb(m, n) as the memory extended from m by allocating n new empty blocks, for each thread i and its thread-local memory $m_i$, we maintain a memory extension between liftnb($m_i$, nb(m)−nb($m_i$)) and the thread-shared memory state m.

The disclosed embodiments include a ternary relation $m_1 \odot m_2 \approx m$ between the private memory states $m_1$, $m_2$ of two disjoint thread sets and the thread-shared memory state m after parallel composition. This relation satisfies the properties in FIG. 12, ensuring that the yield primitive is well-behaved. In particular, the condition nb($m_1$)≤nb($m_2$) ensures that a non-empty memory block will be allocated only in the memory state of the focused thread, guaranteeing that all new memory blocks created between when a thread calls yield and when the thread regains control were allocated by other threads. Lift-L allows us to maintain the disjoint union invariant (i.e., the private memory states for different threads are not overlapping) when a thread yields and gets back control, allocating empty memory blocks in its private memory state $m_i$ to account for blocks allocated in m by other threads.

Based on our disjoint union for two memory states, we then use Rules Lift-R and Lift-L to generalize to N threads by saying that m is a disjoint union of the private memory states $m_1$, . . . , $m_N$ of N threads (on a single processor) if, and only if, there exists a memory state m' such that m' is a disjoint union of $m_1$, . . . , $m_{N-1}$ and $m_N \odot m' \approx m$ holds.

5. Exemplary Implementation

The disclosed embodiments have been implemented the CCAL toolkit in the Coq proof assistant. FIG. 14E presents the number of lines (in Coq) for each component in FIG. 2. The auxiliary library contains the common tactics and lemmas for 64 bit integers, lists, maps, integer arithmetic, etc.

The disclosed embodiments have been used to implement, specify, and verify various concurrent programs. FIG. 14F presents some of the statistics with respect to the implemented components. As for lock implementations, their source code contains not only the code of the associated functions, but also the data structures and their initialization.

In addition to the top-level interface, the specification contains all the specifications used in the intermediate layers. For both the ticket and MCS locks, the simulation proof column includes the proof of starvation freedom (about 1,500 lines) in addition to the correctness proof. The gap between the underlying C implementation and the high-level specification of the locks also contributes to the large proof size for these components. For example, intermediate specification of the ticket lock uses an unbounded integer for the ticket field, while the implementation uses a binary integer which wraps back to zero. Similarly, the queue is represented as a logical list in the specification, while it is implemented as a doubly linked list.

The proof strategies for the concurrent programs are compositional. Both ticket and MCS locks share the same high-level atomic specifications (or strategies) described above. Thus the lock implementations can be freely interchanged without affecting any proof in the higher-level modules using locks. When implementing the shared queue library, we also reuse the implementation and proof of the local (or sequential) queue library. To implement the atomic queue object, we simply wrap the local queue operations with lock acquire and release statements. As shown in FIG. 14F, using verified lock modules to build atomic objects such as shared queues is relatively simple and does not require many lines of code. The performance of the ticket lock has been measured on an intel 4-Core i7-2600S (2.8 GHz). Implementing the ticket lock incurred a latency of 35 CPU cycles.

Consistent with disclosed embodiments, each time a new concrete concurrent object implementation is introduced, the concrete concurrent object implementation can be replaced with an abstract atomic object in its overlay interface. All shared abstract states can be represented using a single global log, so the semantics of each atomic method call may need to replay the entire global log to find out the return value. Though this framework for treating shared atomic objects may appear inefficient, it allows the application of game-semantic ideas and defines a general semantics that supports parallel layer composition.

The disclosed embodiments improve upon concurrent languages that use a parallel composition command to create and terminate new threads, by providing thread spawn and join primitives, and assigning every new thread a unique ID (e.g., t, which must be a member of the full thread-ID domain set D). Parallel layer composition consistent with the disclosed embodiments can be done over the whole program P and over all members of D. This allows reasoning about the current thread's behaviors over the environment's full strategies (i.e., both past and future events). Even if a thread t is never created, the semantics for running P over L[t] are still well defined since it will simply always query its environment context to construct a global log.

Smart Contract Applications

Figure 15:
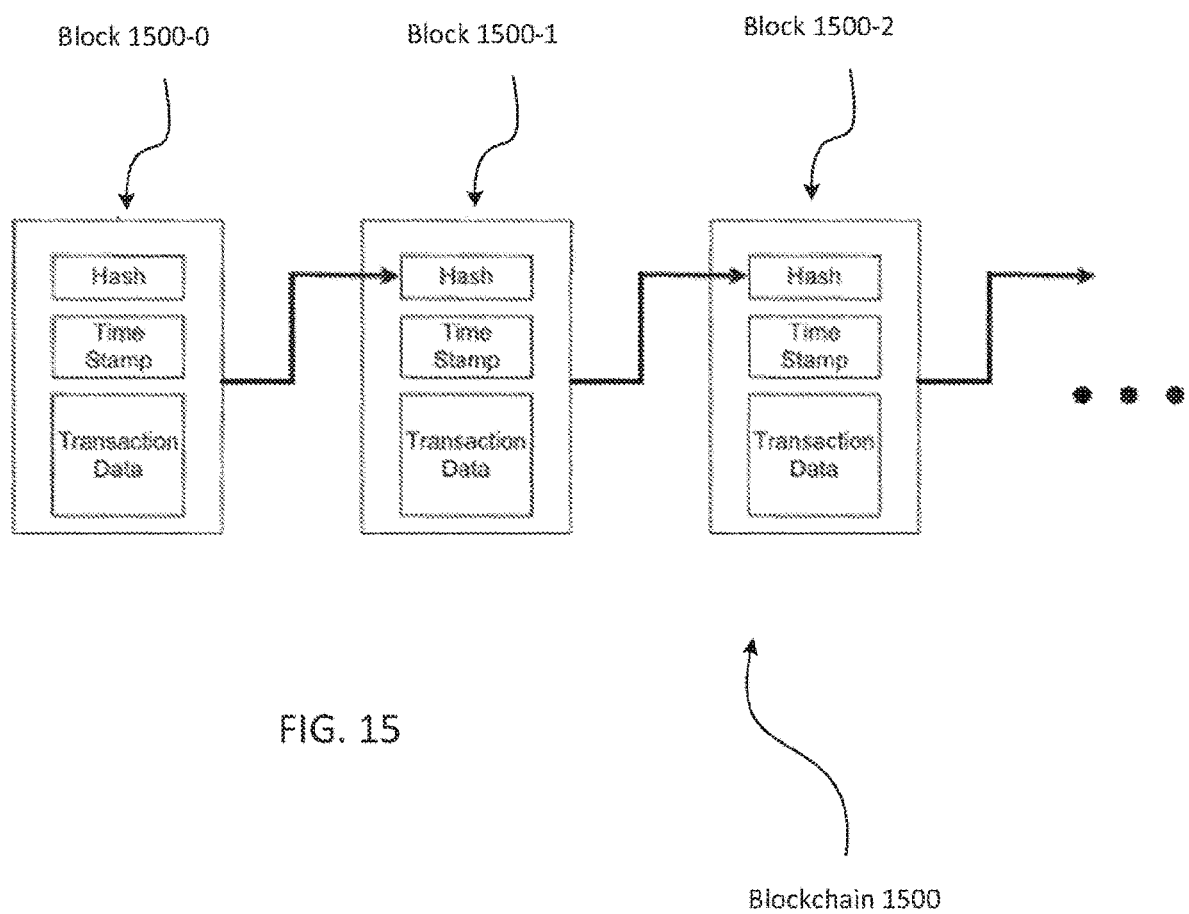
FIG. 15 depicts an illustrative blockchain 1500, in accordance with some embodiments.

FIG. 15 shows an illustrative blockchain 1500, in accordance with some embodiments. In this example, the blockchain 1500 includes a plurality of blocks 1500-0, 1500-1, 1500-2, etc., where each block may include a hash, a time stamp, and transaction data. The time stamp may indicate a time at which the corresponding block was created, and the transaction data may represent one or more transactions to be recorded on the blockchain 1500. The hash in each block, except block 1500-0 (which is sometimes referred to as the genesis block), may be a cryptographic hash of a previous block in the blockchain 1500. In some embodiments, a cryptographic hash function used to hash a block may be deterministic (i.e., given the same input the cryptographic hash function returns the same output), and may be selected such that: it is computationally intensive to, given a certain output, recover the input used to generate the output, or another input that would hash to the same output (e.g., an amount of computation needed to recover the input grows faster than any polynomial function in a size of the output); it is computationally intensive to find two different inputs that result in a same output (e.g., an amount of computation needed to find such a collision grows faster than any polynomial function in a size of the output); and/or a small change to an input (e.g., changing one bit) results in a significant change in the corresponding output (e.g., more than half of the output bits changed). In this manner, an attempt to modify a block may be detected by comparing a result of hashing the block against a hash stored in a subsequent block. For instance, to modify the block 1500-0 without being detected, an attacker may have to also modify the hash stored in the block 1500-1, which in turn necessitates modifying the hash stored in the block 1500-2, and so on. Thus, as more blocks are added to the blockchain 1500, it may become increasingly more difficult for an attacker to modify an earlier block. In some embodiments, a distributed computing platform may be provided by a network of one or more nodes that collectively maintain a blockchain and/or execute one or more smart contracts stored on the blockchain. For instance, software code and/or state information associated with a smart contract may be stored on the blockchain, and may be accessed from the blockchain using a certain address. Execution of the software code may be triggered by an event, and may result in a change in state of the smart contract. This may be recorded on the blockchain as a transaction. In this manner, the smart contract and/or its execution history may be resistant to tampering.

Figure 16:
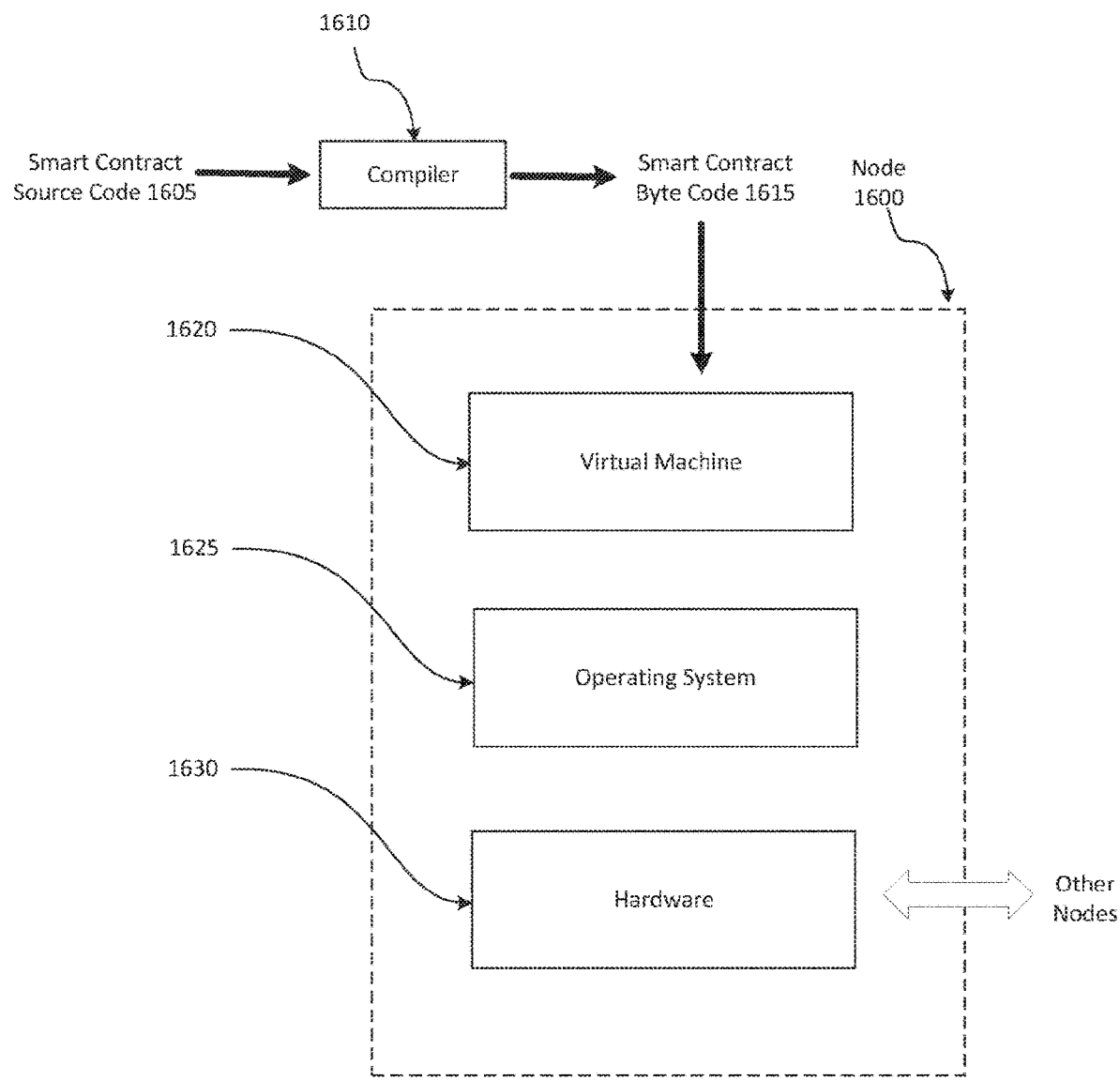
FIG. 16 depicts an illustrative node 1600 participating in a distributed computing platform for executing smart contracts, in accordance with some embodiments.

FIG. 16 shows an illustrative node 1600 participating in a distributed computing platform for executing smart contracts, in accordance with some embodiments. In this example, the node 1600 includes a virtual machine 1620, an operating system 1625, and hardware 1630. The virtual machine 1620 may provide a runtime environment for smart contracts, and may isolate the smart contracts from other processes executing on the node 1600. The operating system 1625 may provide various services to the virtual machine 1620, including, but not limited to, scheduling access to the hardware 1630. The hardware 1630 may include one or more processors, memories, input devices, output devices, network interfaces, etc. For instance, the node 1600 may use a network interface to communicate with one or more other nodes that are also participating in the distributed computing platform. In some embodiments, a compiler 1610 may be provided to compile source code 1605 of a smart contract into byte code 1615, which may be loaded into the virtual machine 1620 for execution. For instance, the virtual machine 1620 may include an interpreter programmed to interpret the byte code 1615. The inventors have recognized and appreciated that correctness of smart contracts may be formally verified using one or more of the techniques described in detail above. For instance, a set of one or more smart contracts may be verified as a concurrent abstraction layer, where a blockchain for recording transactions may be modeled as a global log.

Figure 17:
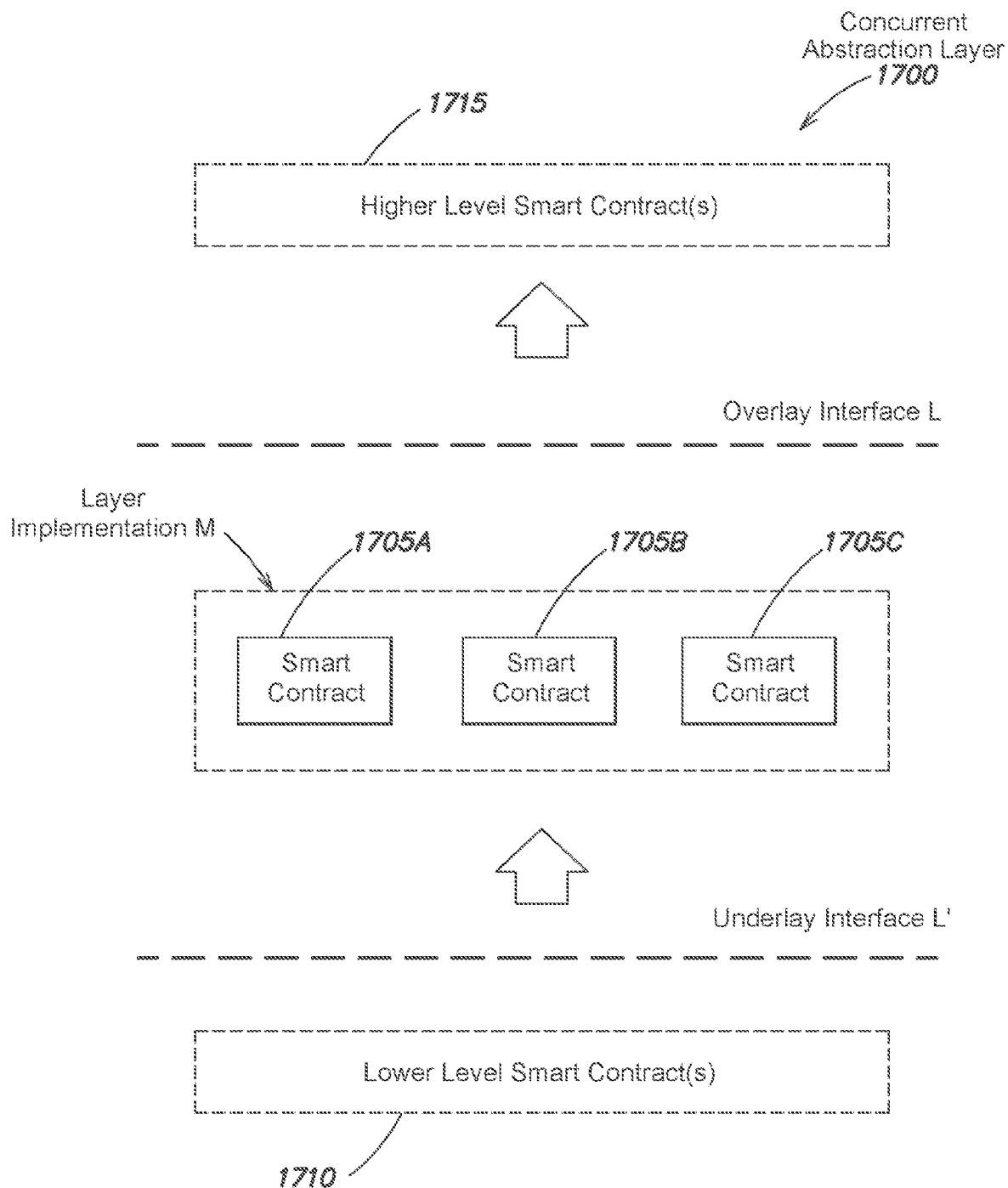
FIG. 17 depicts an illustrative concurrent abstraction layer 1700, in accordance with some embodiments.

FIG. 17 shows an illustrative concurrent abstraction layer 1700, in accordance with some embodiments. In this example, the concurrent abstraction layer 1700 includes a layer implementation M, an overlay interface L, and an underlay interface L'. The layer implementation may include a plurality of smart contracts 1705A, 1705B, 1705C, etc. These smart contracts may interact with each other and/or one or more other smart contracts. For instance, one or more lower level smart contracts 1710 may provide one or more lower level functionalities that the smart contracts 1705A, 1705B, 1705C, etc. may access via the underlay interface L'. The smart contracts 1705A, 1705B, 1705C, etc., making use of the one or more lower level functionalities provided by the one or more lower level smart contracts 1710, may provide one or more higher level functionalities to one or more higher level smart contracts 1715 via the overlay interface L. The inventors have recognized and appreciated that one or more of the techniques described in detail above may be used to verify that the smart contracts 1705A, 1705B, 1705C, etc., running on top of the underlay interface L', simulate the overlay interface L. For instance, in some embodiments, an underlying blockchain used to record transactions performed by smart contracts (e.g., the smart contracts 1705A, 1705B, 1705C, etc.) may be modeled using a first logical global log, and one or more of the techniques described in detail in the attached manuscript may be used to verify that the first logical global log is consistent with a second logical global log representing acceptable behavior.

Figure 18:
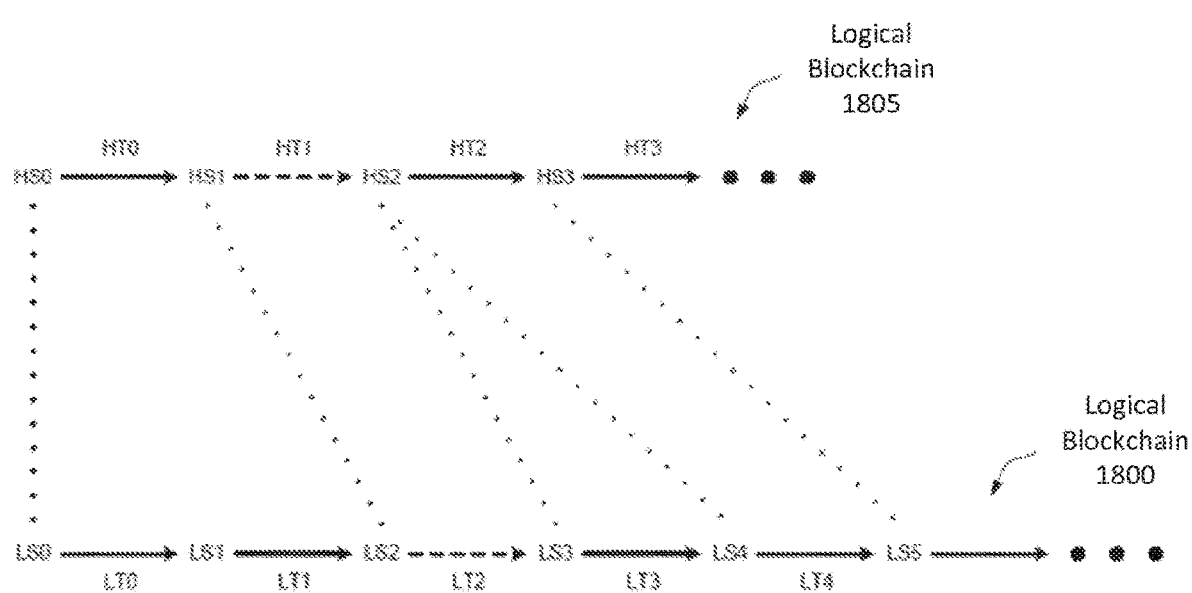
FIG. 18 depicts an illustrative physical blockchain 1800 and an illustrative logical blockchain 1805, in accordance with some embodiments.

FIG. 18 shows an illustrative physical blockchain 1800 and an illustrative logical blockchain 1805, in accordance with some embodiments. The physical blockchain 1800 may be a logical global log representing an underlying blockchain used to record transactions performed by smart contracts (e.g., the illustrative smart contracts 1705A, 1705B, 1705C, etc.), and may include a sequence of lower level transactions LT0, LT1, LT2, etc. The logical blockchain 1800 may be another logical global log, which includes a sequence of higher level transactions HT0, HT1, HT2, etc. In some embodiments, verifying that the smart contracts 1705A, 1705B, 1705C, etc., running on top of the underlay interface L', simulate the overlay interface L may include verifying that the physical blockchain 1800 is consistent with the logical blockchain 1805. As one example, the lower level transactions LT0 and LT1 may, collectively, correspond to the higher level transaction HT0. For instance, the higher level transaction HT0 may be a transfer from a first party to a second party, and may be implemented by the first party initiating the transfer (the lower level transaction LT0) and the second party acknowledging the transfer (the lower level transaction LT1). As another example, the lower level transaction LT2 may be an environment transition, which may represent an action taken by a smart contract executing concurrently as the smart contracts 1705A, 1705B, 1705C, etc. in a lower level environment. The lower level transaction LT2 may correspond to a higher level transaction HT2, which may represent an action taken by a smart contract in a corresponding higher level environment. As another example, the lower level transaction LT3 may represent an action that is taken by the one or more lower level smart contracts 1710 but are unrelated to any lower level functionality provided to the smart contracts 1705A, 1705B, 1705C, etc. Therefore, there is no corresponding higher level transaction in the logical blockchain 1800. As another example, the higher level transaction HT2 may represent a higher level functionality provided by one of the smart contracts 1705A, 1705B, 1705C, etc. to the one or more higher level smart contracts 1715, by calling a lower level functionality provided by the one or more lower level smart contracts 1710. This lower level functionality may be represented by the lower level transaction LT4. In some embodiments, verifying that the smart contracts 1705A, 1705B, 1705C, etc., running on top of the underlay interface L', simulate the overlay interface L may include verifying that, given an environment in which the smart contracts 1705A, 1705B, 1705C, etc. are executing, and given a physical blockchain and a corresponding logical blockchain, one or more lower level transactions to be appended to the physical blockchain may be matched to one or more higher level transactions to be appended to the logical blockchain. Such an environment may capture one or more assumptions about one or more smart contracts that are executing concurrently as the smart contracts 1705A, 1705B, 1705C, etc. The inventors have recognized and appreciated various benefits of verifying one or more smart contracts as a concurrent abstraction layer. For instance, using one or more of the techniques described in detail above, a complex system of concurrently executing smart contracts may be decomposed into a plurality of layer components. These components may be formally specified and verified separately, and then linked together to form an end-to-end fully verified system. Such a verified system may be resistant to attacks because there may be no loop hole. For instance, a software implementation may be consistent with a formal specification at any point during an execution, under all circumstances. In some embodiments, a logical global log may be used to model a blockchain that records every transaction performed by any one of a plurality of smart contract. Formal semantics of a smart contract may be provided based on functions from a logical global log to a sequence of one or more transactions performed by the smart contract (before switching to another smart contract). In some embodiments, a plurality of smart contracts may be combined into a system using horizontal composition and/or parallel composition. For instance, behavior of a smart contract may be verified based on one or more assumptions about behavior of one or more other smart contracts that are executing concurrently as the smart contract to be verified, and the one or more assumptions may be modeled using an environment. In some embodiments, a plurality of smart contracts may be combined into a system using vertical composition. For instance, a new abstraction layer may be built over existing smart contracts (e.g., by hiding one or more lower level transactions and/or introducing one or more higher level transactions). As a result, a new type of logical global log may be provided for each new abstract layer. In some embodiments, consistency between logical global logs at different abstraction layers may verified by establishing a simulation relation between these different global logs and corresponding environments. For instance, environments at different abstraction layers may be connected, and smart contracts at different abstraction layers may be combined based on the corresponding environments. In this manner, vertical composition of smart contracts may be supported, in addition to, or instead of horizontal composition and/or parallel composition. In some embodiments, an environment may indicate past behavior and/or future behavior of one or more smart contracts that are executing concurrently as a smart contract to be verified. In this manner, one or more fairness constraints may be imposed on future behavior of one or more of the smart contracts in the environment, and one or more progress properties may be verified, in addition to, or instead of, functional correctness properties. In some embodiments, each layer module may be formally verified as correctly implementing an overlay interface based on an underlay interface. A specification of the overlay interface may indicate how a logical global log is to be constructed, and/or which environment is to be considered, for the overlay interface. Likewise, a specification of the underlay interface may indicate how a logical global log is to be constructed, and/or which environment is to be considered, for the underlay interface. A formal simulation relation may then be established to connect one or more abstract states, a logical global log, and/or an environment for the overlay interface, with one or more abstract states, a logical global log, and/or an environment for the layer module running on top of the underlay interface. In some embodiments, a formal proof may be constructed to show that a simulation relation holds at a beginning of each method call to a method in a layer module to be verified, and is preserved during execution of each statement in the layer module. In some embodiments, after each layer module is verified, the layer modules may be compiled into assembly layers (e.g., using a verified compiler). The assembly layers may then be combined using horizontal, parallel, and/or vertical composition rules to form a system. In some embodiments, one or more formal specifications and/or proofs include one or more explicit artifacts stored in hard disk or memory, which may be checked independently by a third party.

Figure 19:
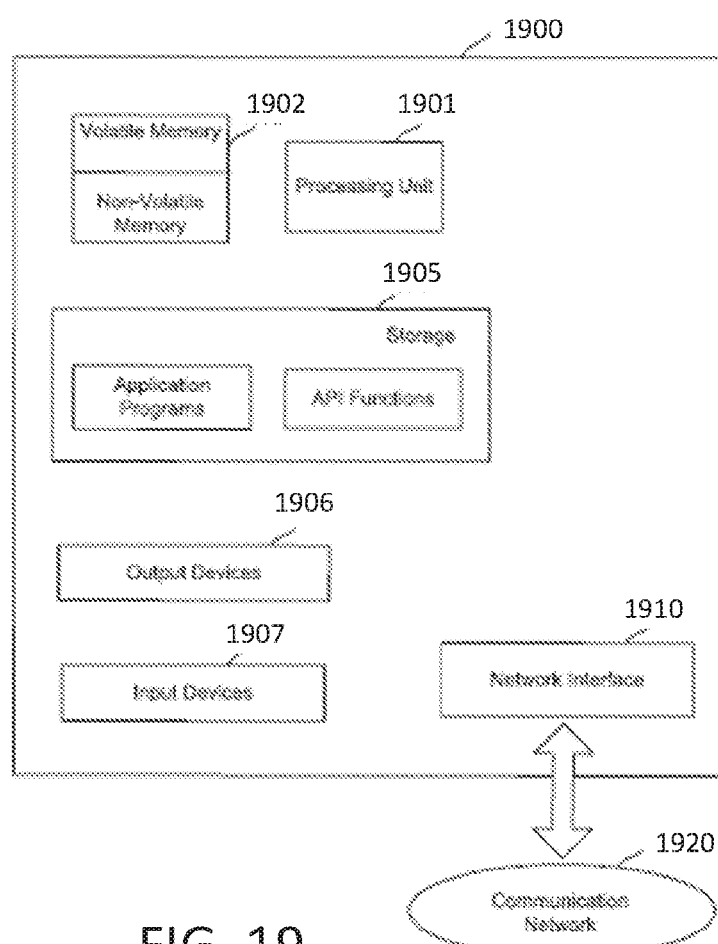
FIG. 19 depicts, schematically, an illustrative computer 19000 on which any aspect of the present disclosure may be implemented.

FIG. 19 shows, schematically, an illustrative computer 1900 on which any aspect of the present disclosure may be implemented. In the embodiment shown in FIG. 19, the computer 1900 includes a processing unit 1901 having one or more processors and a non-transitory computer-readable storage medium 1902 that may include, for example, volatile and/or non-volatile memory. The memory 1902 may store one or more instructions to program the processing unit 1901 to perform any of the functions described herein. The computer 1900 may also include other types of non-transitory computer-readable medium, such as storage 1905 (e.g., one or more disk drives) in addition to the system memory 1902. The storage 1905 may also store one or more application programs and/or external components used by application programs (e.g., software libraries), which may be loaded into the memory 1902. The computer 1900 may have one or more input devices and/or output devices, such as devices 1906 and 1907 illustrated in FIG. 19. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1907 may include a microphone for capturing audio signals, and the output devices 1906 may include a display screen for visually rendering, and/or a speaker for audibly rendering, recognized text. As shown in FIG. 19, the computer 1900 may also comprise one or more network interfaces (e.g., the network interface 1910) to enable communication via various networks (e.g., the network 1920). Examples of networks include a local area network or a wide area network, such as an enterprise network or the Internet. Such networks may be based on any suitable technology and may operate according to any suitable protocol and may include wireless networks, wired networks or fiber optic networks. Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only. The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above. The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure. Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements. Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for formal verification of an overlay interface, comprising;
   modeling the overlay interface as multiple layer implementations built on an underlay interface, the underlay interface parameterized by multiple thread sets;
   verifying the overlay interface by performing at least one of:
      verifying that a map to a program built on the underlay interface implements a map to a strategy, wherein:
         the semantics of running the shared primitive on the underlay interface are simulated by the strategy;
      verifying that a first program module implements the overlay interface according to a first simulation relationship, wherein:
         a second program module built on the underlay interface implements a first intermediate interface according to a second simulation relationship;
         a third program module built on the first intermediate interface implements the overlay interface according to a third simulation relationship; and
         the first program module is a composition of the second and third program modules and the first simulation relationship is a composition of the second and third simulation relationships;
      verifying that a fourth program module implements the overlay interface according to a fourth simulation relationship, wherein:
         a fifth program module built on the underlay interface implements a second intermediate interface according to the fourth simulation relationship;
         a sixth program module built on the underlay interface implements a third intermediate interface according to the fourth simulation relationship; and
         the fourth program module is a composition of the fifth and sixth program modules and the overlay interface is a composition of the second and third intermediate interfaces;
      verifying that a seventh program module built on a fourth intermediate interface implements a fifth intermediate interface according to a fifth simulation relationship, wherein:
         the fourth intermediate interface is simulated by the underlay interface according to a sixth simulation relationship;
         the seventh program module implements the overlay interface according to a seventh simulation relationship;
         the overlay interface is simulated by the fifth intermediate interface according to an eighth simulation relationship; and
         the fifth simulation relationship is a composition of the sixth, seventh, and eighth simulation relationships;
      verifying that an eighth program module built on the underlay interface implements the overlay interface, wherein:
         the underlay interface is parameterized by the union of a first thread set and a second thread set;
         the overlay interface is parameterized by the union of a first thread set and a second thread set;
         a first underlay interface is parameterized by the first thread set and a second underlay interface is parameterized by a second thread set;
         a first overlay interface is parameterized by the first thread set and a second overlay interface parameterized by the second thread set;
         the eighth program module built on the first underlay interface implements the first overlay interface;
         the eighth program module built on the second underlay interface implements the second overlay interface;
         the first underlay interface is compatible with the second underlay interface; and
         the first overlay interface is compatible with the second overlay interface; and
      verifying that an interface parameterized by a third thread set is compatible with the interface parameterized by a fourth thread set, wherein:
         for all threads in third thread set, rely conditions for the interface parameterized by the fourth thread set implies guarantee conditions for the interface parameterized by the third thread set;
         for all threads in fourth thread set, rely conditions for the interface parameterized by the third thread set implies guarantee conditions for the interface parameterized by the fourth thread set;
         rely conditions for the interface parameterized by the intersection of the third and fourth thread sets equal the union of the rely conditions for the interface parameterized by the third thread set and the rely conditions for the interface parameterized by the fourth thread set;
         guarantee conditions for the interface parameterized by the intersection of the third and fourth thread sets equal the intersection of the guarantee conditions for the interface parameterized by the third thread set and the guarantee conditions for the interface parameterized by the fourth thread set; and
         the collection of primitives for the interface parameterized by the intersection of the third and fourth thread sets equals the composition of the collection of primitives for the interface parameterized by the third thread set and the collection of primitives for the interface parameterized by the fourth thread set,
   wherein verifying the overlay interface includes performing all of:
      verifying that the map to the program built on the underlay interface implements the map to the strategy;

verifying that the first program module implements the overlay interface according to the first simulation relationship;

verifying that the fourth program module implements the overlay interface according to a fourth simulation relationship;

verifying that the seventh program module built on the fourth intermediate interface implements the fifth intermediate interface according to a fifth simulation relationship;

verifying that the eighth program module built on the underlay interface implements the overlay interface; and verifying that the interface parameterized by the third thread set is compatible with the interface parameterized by the fourth thread set.

2. The method of claim 1, wherein verifying the overlay interface includes performing at least two of:

verifying that the map to the program built on the underlay interface implements the map to the strategy;

verifying that the first program module implements the overlay interface according to the first simulation relationship;

verifying that the fourth program module implements the overlay interface according to a fourth simulation relationship;

verifying that the seventh program module built on the fourth intermediate interface implements the fifth intermediate interface according to a fifth simulation relationship;

verifying that the eighth program module built on the underlay interface implements the overlay interface; and verifying that the interface parameterized by the third thread set is compatible with the interface parameterized by the fourth thread set.

3. The method of claim 1, wherein verifying the overlay interface includes performing at least three of:

verifying that the map to the program built on the underlay interface implements the map to the strategy;

verifying that the first program module implements the overlay interface according to the first simulation relationship;

verifying that the fourth program module implements the overlay interface according to a fourth simulation relationship;

verifying that the seventh program module built on the fourth intermediate interface implements the fifth intermediate interface according to a fifth simulation relationship;

verifying that the eighth program module built on the underlay interface implements the overlay interface; and verifying that the interface parameterized by the third thread set is compatible with the interface parameterized by the fourth thread set.

4. The method of claim 1, wherein verifying the overlay interface includes performing thread-safe compilation after verifying that the first program module implements the overlay interface according to the first simulation relationship.

5. The method of claim 1, wherein the modeling the overlay interface includes modeling a scheduler with a fair scheduler strategy.

6. The method of claim 1, wherein the modeling the overlay interface includes requiring definite actions.

7. The method of claim 1, wherein the modeling the overlay interface includes modeling an environment context that specifies past events and future events.

* * * * *